United States Patent
Chaudhry et al.

(10) Patent No.: US 12,339,833 B2
(45) Date of Patent: Jun. 24, 2025

(54) BLOCKCHAIN ENABLED SERVICE PROVIDER SYSTEM

(71) Applicant: GIGAFORCE, INC., Sunnyvale, CA (US)

(72) Inventors: Sanjeev Kumar Chaudhry, Sunnyvale, CA (US); Rajeev Rawat, Los Angeles, CA (US)

(73) Assignee: GIGAFORCE, INC., Sunnyvale, CA (US)

( * ) Notice: Subject to any disclaimer, the term of this patent is extended or adjusted under 35 U.S.C. 154(b) by 0 days.

(21) Appl. No.: 17/382,203

(22) Filed: Jul. 21, 2021

(65) Prior Publication Data

US 2022/0027350 A1 Jan. 27, 2022

Related U.S. Application Data

(60) Provisional application No. 63/054,705, filed on Jul. 21, 2020.

(51) Int. Cl.
| | | |
|---|---|---|
| *G06F 16/23* | (2019.01) | |
| *G06F 16/176* | (2019.01) | |
| *G06F 16/182* | (2019.01) | |
| *G06F 40/40* | (2020.01) | |
| *G06Q 40/08* | (2012.01) | |

(52) U.S. Cl.
CPC .......... *G06F 16/2379* (2019.01); *G06F 40/40* (2020.01); *G06Q 40/08* (2013.01); *G06Q 2220/00* (2013.01)

(58) Field of Classification Search
CPC .. G06F 16/2379; G06F 40/40; G06F 16/1824; G06F 16/176; G06Q 40/08; G06Q 2220/00
See application file for complete search history.

(56) References Cited

U.S. PATENT DOCUMENTS

| | | |
|---|---|---|
| 11,507,562 B1 | 11/2022 | Luedtke et al. |
| 11,606,426 B1 * | 3/2023 | Cascioli .............. H04L 67/1068 |
| 2005/0134935 A1 | 6/2005 | Schmidtler et al. |
| 2005/0204191 A1 | 9/2005 | McNally et al. |
| 2007/0100812 A1 | 5/2007 | Simske et al. |

(Continued)

OTHER PUBLICATIONS

United States Office Action, U.S. Appl. No. 17/709,165, filed Nov. 22, 2024, 44 pages.

(Continued)

*Primary Examiner* — Robert W Beausoliel, Jr.
*Assistant Examiner* — Mohammad S Bhuyan
(74) *Attorney, Agent, or Firm* — Fenwick & West LLP

(57) ABSTRACT

A system provides document storage and sharing on behalf of nodes of a blockchain system. The system includes one or more databases and one or more servers. The one or more servers receive file content of a document from a first node of the blockchain system and stores the file content in the one or more databases. A file hash of the document is generated by applying a hash function to the file content. The file hash is sent to the first node, such as for sharing with one or more other authorized nodes. The one or more servers receives a request for the document from a second node of the blockchain system, the request including the file hash. In response, the one or more servers send the file content of the document to the second node.

20 Claims, 11 Drawing Sheets

(56) References Cited

U.S. PATENT DOCUMENTS

| | | | |
|---|---|---|---|
| 2013/0272523 | A1 | 10/2013 | McCorkindale et al. |
| 2017/0206409 | A1 | 7/2017 | Bataller |
| 2018/0067957 | A1 | 3/2018 | Paterson et al. |
| 2019/0005049 | A1 | 1/2019 | Mittal |
| 2019/0114360 | A1 | 4/2019 | Garg et al. |
| 2019/0180098 | A1 | 6/2019 | Carpenter et al. |
| 2019/0229890 | A1* | 7/2019 | Brehmer ................ H04L 9/088 |
| 2019/0294817 | A1* | 9/2019 | Hennebert ............ H04L 9/0861 |
| 2019/0347429 | A1 | 11/2019 | Jean-Louis |
| 2020/0153637 | A1* | 5/2020 | Sakai .................. G06F 21/6218 |
| 2020/0160452 | A1* | 5/2020 | Hu ........................ G06Q 40/08 |
| 2020/0175554 | A1* | 6/2020 | Vukich ................ H04L 9/3239 |
| 2020/0204358 | A1* | 6/2020 | Nandakumar ........ H04L 9/3239 |
| 2020/0349261 | A1* | 11/2020 | Koorella .............. G06F 21/6209 |
| 2020/0394321 | A1* | 12/2020 | Ramos .................. G06F 21/64 |
| 2021/0109919 | A1* | 4/2021 | Raj ........................ G06F 21/64 |
| 2021/0117670 | A1 | 4/2021 | Manchanda et al. |
| 2021/0224253 | A1* | 7/2021 | Shrinivasan ........ G06F 16/2379 |
| 2021/0224334 | A1* | 7/2021 | Shrinivasan .......... H04L 9/0637 |
| 2021/0319179 | A1 | 10/2021 | Muffat |
| 2021/0334455 | A1 | 10/2021 | Gkoulalas-Divanis et al. |
| 2022/0283987 | A1 | 9/2022 | Nakamura |

OTHER PUBLICATIONS

United States Office Action, U.S. Appl. No. 17/709,162, filed Nov. 20, 2024, 44 pages.

* cited by examiner

BLOCKCHAIN ENABLED SERVICE PROVIDER SYSTEM

CROSS REFERENCE TO RELATED APPLICATIONS

This application claims the benefit of U.S. Provisional Patent Application No. 63/054,705, filed Jul. 21, 2020, which is incorporated by reference in its entirety.

TECHNICAL FIELD

The disclosure generally relates to blockchain systems, and more specifically to document sharing in blockchain systems.

BACKGROUND

Blockchain systems use distributed ledger technology (DLT) where nodes are connected to each other via a network and each node has a ledger that is synchronized with the ledgers of other nodes. Transactions are written in each node's ledger according to a decentralized application philosophy. However, the amount of data that is stored in the nodes and transferred through the network can become extremely large when transactions involve documents (also referred to as files or attachment). For example, the size of data transmitted through the network for a single transaction may be defined by Equation 1:

$$\text{Size of Data Transmitted} = (N-1) \ast (\text{data size of transaction}) \quad (1)$$

where N is the number of nodes involved in the transaction.

The size of data stored in the nodes of the blockchain system may be defined by Equation 2:

$$\text{Size of Data Stored} = (N) \ast (\text{data size of transaction}) \quad (2)$$

where N is the number of nodes involved in the transaction.

Furthermore, the nodes in the blockchain system may be controlled by different parties. In this case, each party implements a solution to store the documents in its node. This leads to various complications when many parties are involved.

SUMMARY

Example embodiments relate to a document storage system that facilitates document sharing between nodes of a blockchain system. The document storage system is a centralized object (e.g., document) storage that provides an abstraction layer so that the nodes do not need to handle object storage. Some embodiments include a system with one or more databases and one or more servers. The one or more servers receive file content of a document from a first node of the blockchain system and stores the file content in the one or more databases. A file hash of the document is generated by applying a hash function to the file content. The file hash is sent to the first node, such as for sharing with one or more other authorized nodes. The one or more servers receives a request for the document from a second node of the blockchain system, the request including the file hash. In response to receiving the request, the one or more servers send the file content of the document to the second node.

Some example embodiments include a method performed by one or more servers having one or more processors. The method includes: receiving file content of a document from a first node of a blockchain system; storing, in one or more databases, the file content; generating a file hash of the document by applying a hash function to the file content; sending the file hash of the document to the first node; receiving a request for the document from a second node of the blockchain system, the request including the file hash; and in response to receiving the request including the file hash, sending the file content of the document to the second node.

Some example embodiments include a non-transitory computer readable medium comprising stored program code. The program code when executed by one or more processors configures the one or more processors to: receive file content of a document from a first node of a blockchain system; store, in one or more databases, the file content; generate a file hash of the document by applying a hash function to the file content; send the file hash of the document to the first node; receiving a request for the document from a second node of the blockchain system, the request including the file hash; and in response to receiving the request including the file hash, sending the file content of the document to the second node.

Figure 1:
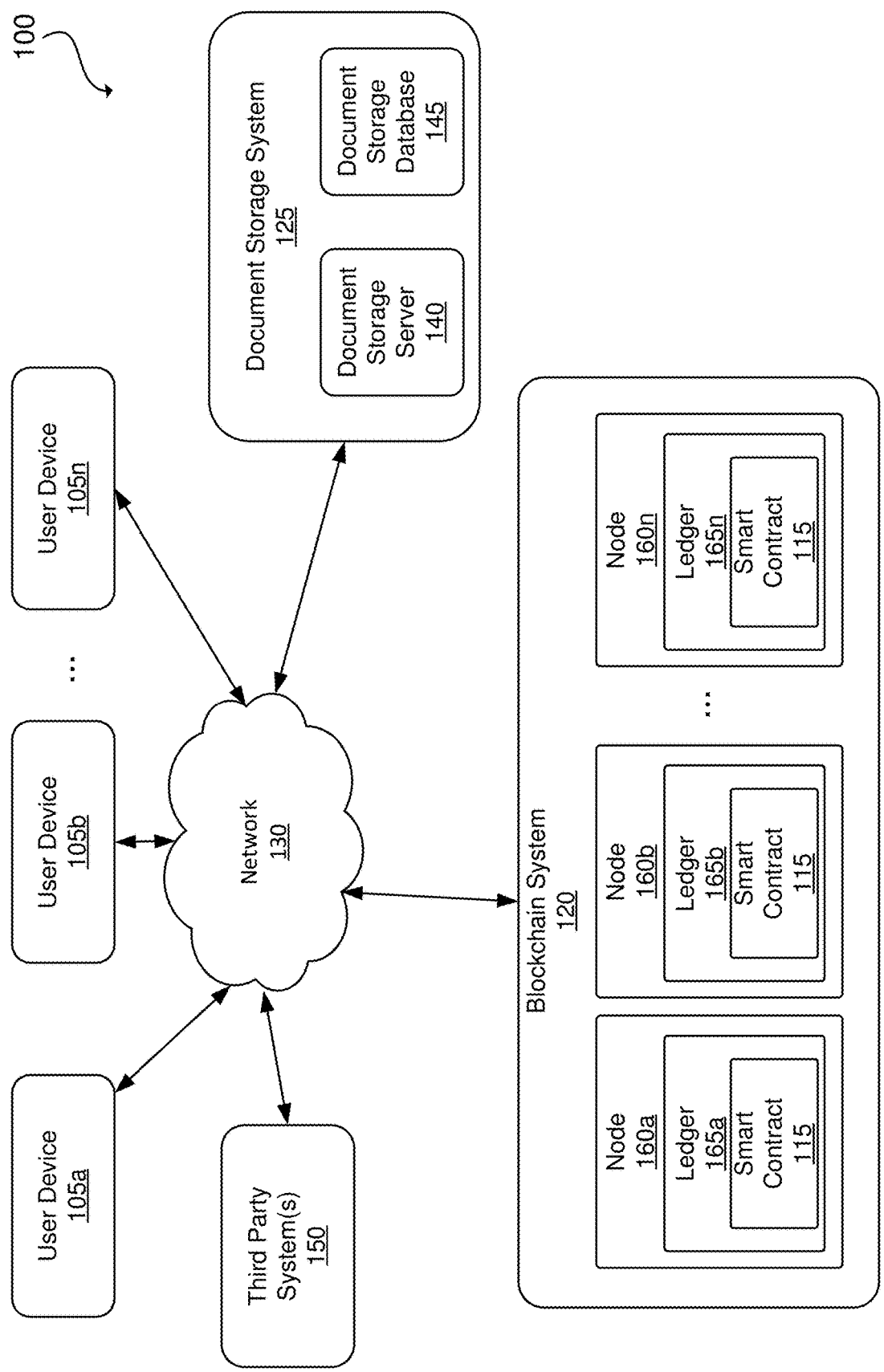
FIG. 1 depicts an example blockchain enabled operating environment, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

For years, the traditional insurance business model has proven to be a surprisingly resilient one. However, traditional insurance is beginning to feel the digital effect as emerging technologies change the way consumers interact with businesses and how products and services are delivered. There's a general perception that the global insurance industry lags other financial service sectors, leaving much to be desired in terms of cost-savings and efficiency. There are also issues concerning fraud, human error and cyber-attacks. Current use of computing systems by insurance carriers is often unsecure and prone to undesired alterations. If a particular carrier is compromised, it may be difficult to detect that a specific transaction is compromised, which leads to significant losses in terms of resources (e.g., money, effort, time, etc.). The cost of insurance fraud is high, such as more than $40 billion a year in the United States. The outdated nature of the insurance industry's processes leaves room for error and potential fraud.

Embodiments relate to a distributed and decentralized ledger, to facilitate insurance transactions. An example of a distributed ledger system that may be decentralized is a blockchain system (or blockchain). The blockchain system may include a decentralized application architecture of processing nodes that are connected by a network. The nodes of the blockchain system may be associated with various parties (e.g., insurance carriers) of insurance claim processes. This decentralized application architecture also may be referred to as distributed ledger technology (DLT). Another example of a DLT is FNOL (First Notice of Loss), where as soon as carriers receives the FNOL from Claimant that is being distributed to an adverse party carrier or that person also along with all attached documents, the system shares information in real time, and securely to all parties.

The blockchain system changes the way insurance is contracted. For example, the blockchain system optimizes efficiency, security and transparency for the insurance industry, using ledgers and fortified cybersecurity protocol. The blockchain system also helps reduce administrative costs through automated verification of claims/payments data from third parties. Insurance carriers can quickly view past claims transactions registered on the ledgers of the blockchain system for reference. The blockchain system can also help ensure that insurance carriers are rebalancing their exposures against specific risks.

Property and casualty insurance includes primarily automobile, commercial and home insurance. Processing claims requires significant manual entry, which leaves room for human error. The blockchain system make claims processes (e.g., three times) faster and (e.g., five times) cheaper. By using shared ledgers and smart contracts (software that checks for certain transactions in the network and automatically executes actions based on pre-specified conditions being met) to conduct insurance policies, the claims and payment processes can be automated to create more efficiency and accuracy. Smart contracts include programmable code that are executed by the nodes of the blockchain system to help automate claims processing.

Some advantages of the blockchain system include improved accuracy by removing human involvement, greater user privacy and security, lower processing fees, and decentralization that improves security by making tampering with data and systems more difficult.

However, the use of DLT poses challenges for storing and managing documents (also referred to as files or attachments) participating in ledger transactions or acting as atomic transactions. These documents may be related to assets of a transactions (e.g., invoice document of a vendor payment transaction), and there are numerous cases where documents are needed in transactions that make a transaction as whole. In other cases, the sharing or transferring of documents may be considered as transactions.

Embodiments related to a document storage system that provides document storage and document sharing on behalf of the nodes of the blockchain system (and thus the parties involved in insurance claims). The document storage system may store the documents in binary immutable form. The document storage system generates and shares file hashes that reference the documents with the blockchain system. For example, the document storage system sends a file hash of a document to a node, and the node executes a smart contract to shares the hash with one or more other nodes that are authorized to access the document. The smart contract includes program code that controls which other nodes should receive the file reference. The other nodes that receive the file hash store the file hash in their ledgers (e.g., instead of the documents themselves) and requests the documents from the document storage system as needed using the file hashes. The smart contract and the blockchain system control document access without having to store the document in the distributed ledgers or transfer the document between the nodes. As such, the amount of data that is stored in the ledgers of the nodes and transferred between the nodes for transactions involving documents is reduced. This not only saves storage space across for the parties but also allow any users visibility of the documents and document changes throughout the life cycle of the claims.

In some embodiments, the blockchain system provides for artificial intelligence (AI)/machine learning (ML) driven document processing. The blockchain system provides for automated document redaction and document indexing for documents (e.g., in formats such as docx, pdf, rtf, gif, etc.) The blockchain system ensures that these document changes are stored in blocks and visible by the authorized parties.

For document redaction, the blockchain system uses AI/ML (e.g., natural language processing (NLP)) to suppress data from the documents. During sharing of a document between parties, personal Identifiable information (PII) and/or Personal Health Information (PHI) data is redacted from the document. This process can prevent loss for the parties (e.g., millions of dollars) if their "data at rest" or "data in motion" is hacked or otherwise shared without authorization. Furthermore, the documents are preserved in their original (e.g., unredacted) shape and form to use for any auditing purposes.

For document classification (also referred to as indexing), the blockchain system use AI/ML to perform document splitting and stitching. For document splitting, the blockchain system reads the contents of a document, classifies portions (e.g., pages) of the document as separate documents using a machine learning model, and splits the document into the separate documents. The separate documents may be stored into predicted folders for user review and analysis. For document stitching, the blockchain system reads multiple documents (e.g., multiple files) and combines the documents into a smaller number of documents (e.g., a single document) using the machine learning model. The documents may be stored in a folder structure automatically based on classifications. The classifications may be updated via user feedback and the feedback may be used to train the machine learning model.

Document Storage System for Blockchain

FIG. 1 is a block diagram of a blockchain enabled operating environment 100, in accordance with one or more embodiments. The environment 100 includes user devices 105a through 105n (individually referred to as user device 105), a blockchain system 120 including nodes 160a through 160n (individually referred to as nodes 160), a document storage system 125, one or more third party systems 150, and a network 130. Some embodiments of the environment 100 may have different components than those described here. Similarly, in some cases, functions can be distributed among the components in a different manner than is described here.

The user devices 105 may be various types of computing devices, such as a smartphone, tablet, laptop, or desktop computing device. Each user device 105a through 150n may be associated with a party for insurance related activities. The parties may include insurance carriers, insurance policy holders, beneficiaries, managing general agents (MGAs), third party administrators (TPAs), subrogation companies, recovery companies, law firms, etc. In one example, a carrier device 105a is associated with an insurance carrier A and a carrier device 105b is associated with an insurance carrier B. The insurance carrier A is a payee for an insurance claim and the insurance carrier B is the payer.

The insurance carriers A and B are examples of blockchain enabled insurance carriers that interact with the blockchain system 120 to execute transactions defined by smart contracts. The insurance carriers A and B also interact with the document storage system 125 to exchange documents associated with the transactions. The environment 100 may include multiple insurance carriers, each associated with a user device 105. Each insurance carrier may have an application (e.g., a claims application) that executes on their respective user device 105 for communication with the blockchain system 120 and document storage system 125. The user devices 105 may also manage access to the blockchain 120.

The blockchain system 120 includes the interconnected nodes 160a through 160n. Different nodes 160 may be associated with different parties. For example, the node 160a may be associated with the insurance carrier A, and the user device 105a of the insurance carrier A may communicate with the blockchain system 120 via the node 160a. Similarly, the node 160b may be associated with the insurance carrier B, and the user device 105b of the insurance carrier B may communicate with the blockchain system 120 via the node 160b. In another example, each insurance carrier may communicate with the blockchain system 120 via any of the nodes 160. The blockchain system 120 may be public, private (e.g., with all nodes 160 being controlled by an entity that also controls the document storage system 125), or a combination thereof. The nodes 160 may communicate with each other using a communication protocol such as Real-time Application Programming Interface (API) or Secure File Transfer Protocol (SFTP) technology.

Each node 160a through 160n includes a respective ledger 165a through 165n (individually referred to as ledger 165). The data stored in each ledger 165 include a chain of blocks (or "blockchain"), with each block representing a transaction. For example, each block may include a hash, transaction data of the transaction, and a hash of a previous block in the chain. The blockchain is resistant to modification because once recorded, the data in any given block cannot be altered retroactively without altering all subsequent blocks. The nodes 160 use a distributed ledger technology (DLT) where the stored data in the ledgers 165 are synchronized using a consensus algorithm. For a block to be added to the blockchain of the ledgers 165, a transaction occurs, the transaction is verified, the transaction is be stored in a block and the block is given a hash (also referred to as a "block hash"). When a block is added at one of the nodes 160, each node 160 constructs the new block. In the verification, the nodes 160 are polled (e.g., by consensus algorithm) regarding which copy of the block is correct. Once a consensus has been determined, the other nodes 160 update their ledgers 165 with the correct copy of the new block.

The nodes 160 each stores program code in the form of smart contracts 115. A smart contract 115, when executed by one or more processors of the node 160, configures the node 160 to perform functionality as specified by the program code of the smart contract. The smart contracts 115 may be stored in the ledgers 165 of the nodes. This allows any of the nodes 160 to execute any smart contract 115 as peer nodes. In some embodiments, the smart contracts may be stored outside of a ledger 165 or are otherwise not replicated across all the nodes 160. Here, the nodes 160 only execute the smart contracts 150 they can access. Each node 160 may include one or more servers that perform the functionality discussed herein, including execution of smart contracts 115, and one or more databases that store a ledger 165 and other data.

A smart contract 115 may represent an agreement between parties that is executed via one or more transactions. Each completed transaction changes the state associated with the smart contract 115 and is recorded in the ledgers 165 of the nodes 160. In some embodiments, the smart contract 115 may enforce an insurance agreement between the insurance carrier A who requests a payment for an insurance claim and the insurance carrier B who provides the payment. Here, the smart contract 115 may specify the parties of the insurance claim, the process steps in the insurance claim (e.g., first notice of loss (FNOL), investigation, risk score evaluation, damage evaluation, payment, etc.), and the documents used in the process steps. Each process step may include one or more transactions. The collecting and sharing of documents related with these process steps may also be transactions. In some embodiments, the transactions of the smart contract are defined by "if . . . then" statements in the program code. Each completed transaction (e.g., caused by satisfaction of the "if" condition) changes the state of the smart contract 115 and is recorded as a block in the ledgers 165 of the nodes 160.

For example, when the insurance carrier A via user device 105a sends a request for payment for an insurance claim to a node 160a, a smart contract 115 associated with the insurance carrier B may define the conditions that must be satisfied in order for the insurance carrier B to provide the payment. These conditions are stored and enforced by the program code of the smart contract 115, such as in the form of "if . . . then" statements in program code. The smart contract 115 may also include variables defining the state of the smart contract in terms of satisfaction of these conditions. For example, these variables may define whether documents or other information pertaining to the satisfaction of the conditions have been collected or shared, such as a claim number, claim details, FNOL report, policy information, vehicle information, police reports, pictures (e.g., of damaged vehicles), payment information, legal discussions, notes, attachments, date of availability of funds from other carrier/adverse party/subrogation/recovery companies, availability execution dates and/or times.

The smart contract 115 may also manage access rights for documents. For example, the smart contract 115 may specify that if the insurance carrier A provides a document to a node 160 (e.g., indicating claim number, claim details, FNOL report, policy information, vehicle information, police reports, pictures (e.g., of damaged vehicles), payment information, legal discussions, notes, attachments, availability dates and/or times, etc.), then insurance carrier B, the adverse party and other parties such as the insurance holders, TPA/MGA/law firms, etc. can access this document. Similarly, the smart contract 115 may specify that if the insurance carrier B provides a document, then the insurance carrier A and other parties can access this document. In that sense, the nodes 160 of blockchain system 120 controls the secure transfer of the documents between two or more parties.

The document storage system 125 stores and facilitates sharing of the documents between nodes 160 and user devices 105 (e.g., via the nodes 160). The document storage system 125 includes a document storage server 140 and a document storage database 145. The system 125 may include one or more document storage servers 140 and one or more document storage databases 145. When a node 160a, for example, receives file data of a document pertaining to a transaction of a smart contract 115 from a user device 105a, the node 160a (e.g., as configured by the smart contract 115) sends the file data to the document storage server 140. The file data may include a file name, file content, and a file identifier. The file name is a name for the document. The file content is the data content of the document. The file identifier defines a (e.g., unique) identifier for the document. In some embodiments, the node 160a generates the file identifier such that it is unique from other file identifiers stored in the ledger 165. The document storage server 140 stores the file data of the document in the document storage database 145. The document storage server 140 generates a file hash of the document using the file data and sends the file hash to the node 160a. The node 160a stores the file hash in the ledger 165a of the node 160a. The node 160a shares the file hash with one or more other nodes 160, such as a node 160b, as configured by the smart contract 115. The node 160b stores the file hash received from the node 160a in the ledger 165b of the node 160b. To retrieve the document, the node 160b sends a request for the document to the document storage system 125 using the file hash. The document storage system 125 sends the document to the node 160b in response to the request. After receiving the document, the node 160b may provide the document to the user device 105b.

While the nodes 160 of the blockchain system 120 control access to the document and the transfer of the document via sharing of the file hash, the document is not stored in the ledgers 165 of the nodes 160 of the blockchain system 120 and are not transferred directly between the nodes 160. Instead, the document storage system 125 stores the document and shares the document with authorized parties via their nodes 160, where the authorization is defined by the smart contract 115 that execute in the blockchain system 120. For example, a smart contract 115 may specify for a node 160a that a received file hash from a document can be shared with node 160b, but not node 160n.

The third party system(s) 150 include systems associated with weather services, credit bureaus for credit reports and DPL (Direct Payment and Legal) service providers as HealPay, Stripe, Tanium etc. As specified by smart contracts 115, the nodes 160 of the blockchain system 120 may communicate with the third party systems 150 to execute transactions such as (e.g., automated) verification of claims or payment data, or verification of documents. Each third party may also have an associated node 160 in the blockchain system 120, and documents may be shared with third party systems 150 via their nodes 160 using file hashes by the document storage system 125. In some embodiments, the third party systems 150 communicate with the nodes 160 of the blockchain system 120 using a communication protocol such as the Real-time API.

The network 130 connects the user devices 105, blockchain system 120, document storage system 125, and third party system(s) 150. The network 130 may include one or more local area networks, one or more wide area networks (e.g., including the Internet), or combinations thereof. The nodes 160 of the blockchain system 120 may also be connected to each other via the network 130. Examples of technologies used for communication by the nodes 160 include Ethernet 802.11, 3G, 4G, 802.16 or any other suitable communication technology. Examples of protocols used by the network of nodes 160 include transmission control protocol/internet protocol (TCP/IP), hypertext transport protocol (HTTP), simple mail transfer protocol (SMTP), file transfer protocol (FTP), or any other suitable communication protocol.

Figure 2:
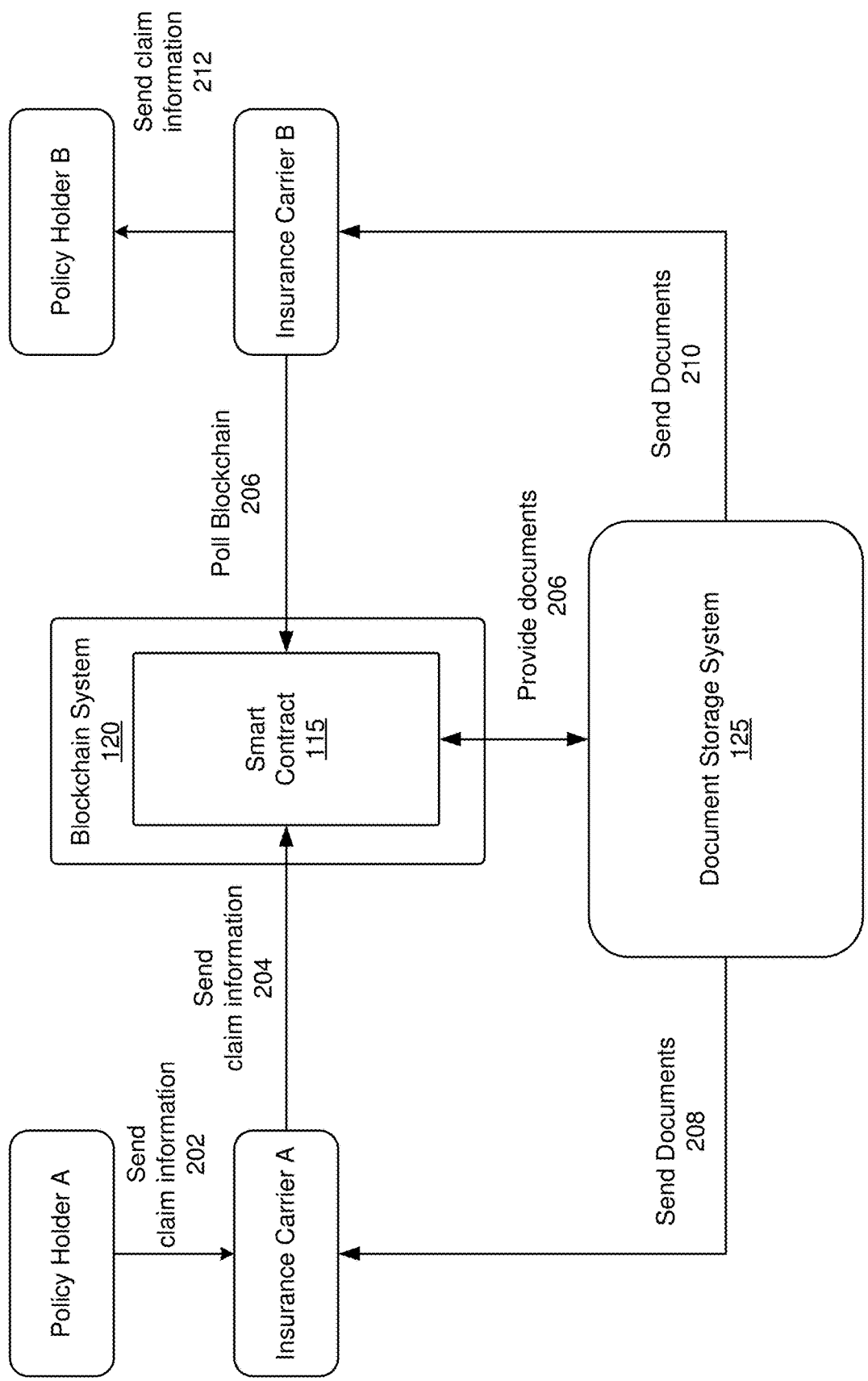
FIG. 2 is a flow diagram of a claim information sharing process on the blockchain enabled operating environment, in accordance with one or more embodiments.

FIG. 2 is a flow diagram of a claim information sharing process on the blockchain enabled operating environment, in accordance with one or more embodiments. The process may include fewer or additional steps, and steps may be performed in different orders. The process includes multiple parties including a policy holder A, an insurance carrier A, a policy holder B, and an insurance carrier B. The policy holder A has an insurance policy provided by the insurance carrier A and the policy holder B has an insurance policy provided by the insurance carrier B. In this example, the insurance carrier A may be requesting payment for an insurance claim from the insurance carrier B. As an example of operation, the smart contract 115 of the blockchain system 120 may manage access rights of the insurance carriers A and B, such as via their nodes 160a and 160b, to information including documents.

The policy holder A sends 202 claim information regarding the insurance claim to the insurance carrier A. The smart contract 115, which operates on the blockchain 120, allows insurance carrier A (e.g., using user device 105a) to send 204 the claim information to the blockchain system 120, such as a node 160a of the insurance carrier A. The claim information may include documents (e.g., including notes, pictures of vehicles, etc.), claim details, policy information, vehicle information (e.g., if the claim is a vehicle insurance claim), payment information, legal discussions, etc.

The insurance carrier B, such as via its node 160b, polls 206 the smart contract 115 for the received claim information. The polling may be performed in real-time or in batches. Via, the polling, the insurance carrier B approves the claim information provided by the insurance carrier A. Multiple parties may be polled when new claim information or claim information updates are provided to the blockchain system 120. The claim information is approved when the parties reach a consensus, and the state of the smart contract 115 is updated. The blockchain system 120 may continuously update the state (e.g., as defined by stored values) of the smart contract 115 in response to receiving and/or updating the claim information. State updates are transactions that are stored as blocks in the ledgers 165 of the nodes 160.

If the documents are approved via the polling, the node 160a of the insurance carrier A of the blockchain system 120 provides 208 the documents to the document storage system 125 for storage and sharing with other authorized nodes 160. As discussed in greater detail below in connection with FIG. 4, the smart contract 115 controls the sharing of the documents by the document storage system 125 by controlling the sharing of file hashes of the documents between authorized nodes 160. The authorized nodes 160 use these file hashes to request corresponding documents from the document storage system 125. For example, the insurance carriers A and B may be authorized to receive the documents. The document storage system 125 sends 208 the documents to the insurance carrier A and sends 210 the documents to the insurance carrier B. These documents may include notes or attachments that are provided in real-time. The smart contract 115 may also control the sharing of activities, pictures, and payments (e.g., token or hash key equivalents). The insurance carrier B may send 212 the claim information or the documents received from the document storage system 125 to the policy holder B. As such, the smart contract 115 controls the transfer of the claim information and documents between the insurance carrier A and the insurance carrier B (as well as with any other parties), and their respective policy holders A and B.

Figure 3:
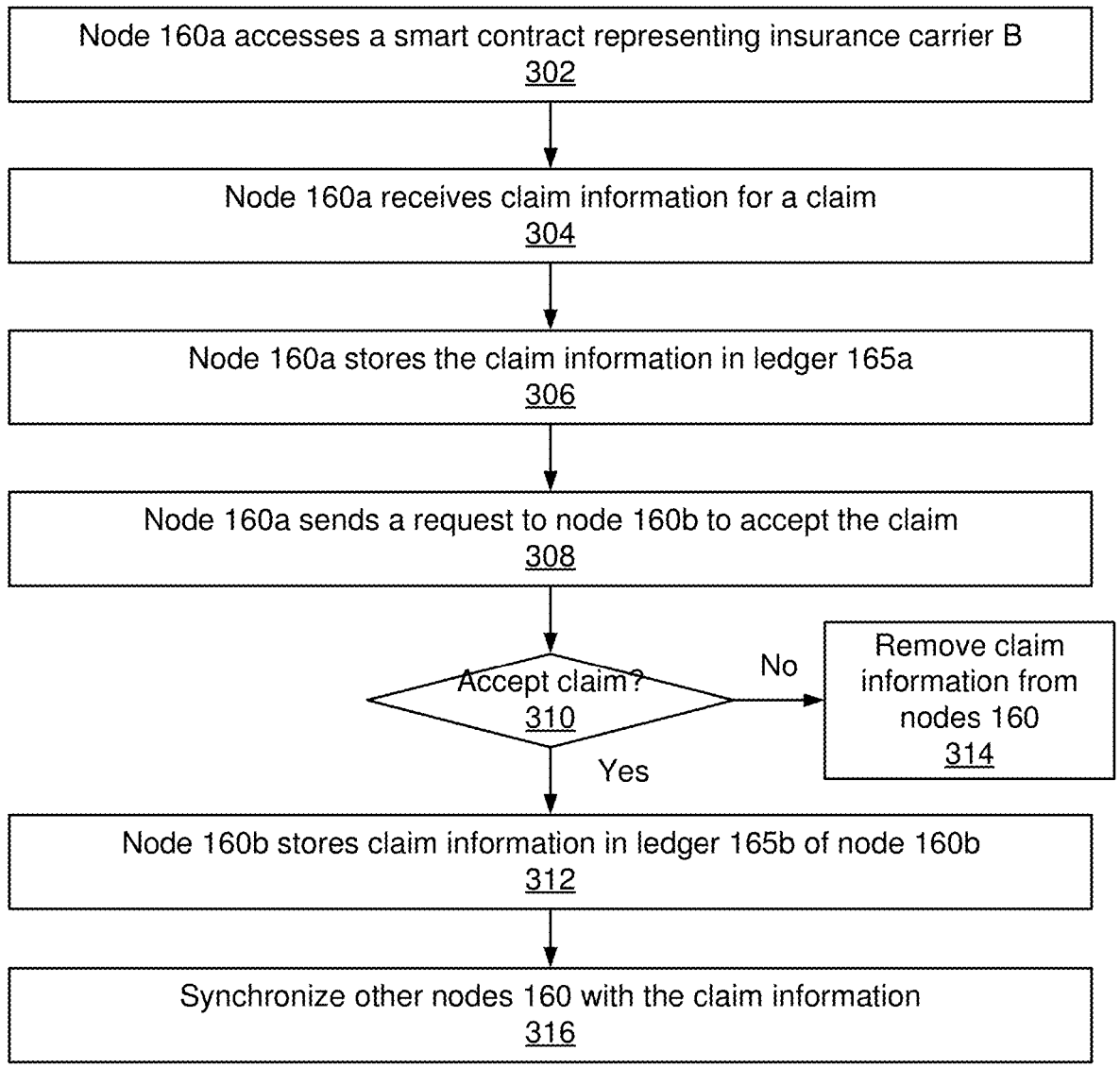
FIG. 3 is a flow diagram of a booking process on the blockchain enabled operating environment, in accordance with one or more embodiments.

FIG. 3 is a flow diagram of a booking process on the blockchain enabled operating environment, in accordance with one or more embodiments. The process may include fewer or additional steps, and steps may be performed in different orders. The functionalities discussed for the nodes 160 may be performed by the nodes 160 executing smart contracts 115. The nodes 160 include a node 160a of an insurance carrier A and a node 160b of an insurance carrier B.

The node 160a of the insurance carrier A accesses 302 a smart contract 115 of an insurance carrier B. For example, the node 160a looks up a smart contract 115 on the blockchain system 120 that that represents the insurance carrier B. The node 160a of the insurance carrier A may access a dynamic registry and identify the node 160b and/or smart contract 115 that corresponds with the insurance carrier B. In some embodiments, the dynamic registry may be accessed from a third-party system or blockchain (e.g. an application/website, user mobile application, Broker application etc.).

Gaining access to the smart contract 115 includes gaining access to the variables of the smart contract 115 corresponding to the insurance carrier B. The variables may specify parameters associated with the insurance carrier B such as a claims file, notes, file attachments, and pictures availability dates of the insurance carrier B, and/or other information.

The node 160a of the insurance carrier A sends an electronically signed request to the node 160b of the insurance carrier B to get the access on FNOL (first notice of loss) to the insurance carrier B. The request may include claims information, policy details, vehicle information, 3rd party claimant information, losses, and any other information that can provide a service. The node 160a generates the request that includes a user identifier assigned to a user of the insurance carrier A. For example, the user identifier can refer to an identifier assigned to the user register as a member of the blockchain system 120. Additionally, the generated request includes a payment amount as well as variables that specifies the desired parameters of the service.

The node 160a electronically signs the request using a key (e.g., private/public key) that is assigned to the user of the insurance carrier A. For example, the insurance carrier A may electronically sign the request by encrypting the request using the private key assigned to the user. In various embodiments, the node 160a may further include the public key assigned to the user in the electronically signed request. Thus, the insurance carrier A sends the electronically signed request.

The node 160b processes the request provided by the node 160a. The smart contract 115 on the blockchain system 120 receives and decrypts the electronically signed request. For example, the electronically signed request is decrypted using the included public key of the user to obtain the content of the request (e g., user identifier of the user, payments, and specified parameters).

The node 160b determines whether the conditions for providing access are fulfilled. For example, the node 160b executes the smart contract 115 to check whether the correct funds that satisfy the variables of the smart contract 115 have been included in the electronically signed request. If the conditions for providing access are not fulfilled, the insurance carrier A is denied access to send claims to the insurance carrier B. If the conditions for providing access are fulfilled, the insurance carrier A is granted with access to send claims to the insurance carrier B.

After the insurance carrier A has gained access to the smart contract, the node 160a receives 304 claim information for a claim from the insurance carrier A (e.g., the user device 105a) and stores 306 the claim information in the ledger 165a of the node 160a. Using the smart contract 115, the node 160a may determine whether the claim information is for a new claim or existing claim. If the claim information is for a new claim, then the node 160a may determine a claim condition. The claim condition defines a complexity of the claim. In some embodiments, the claim condition may be defined by a risk score that is determined by an artificial intelligence (AI)/machine learning (ML) engine that executes on the node 160a. If the claim is determined to be complex or otherwise unsuitable for handling by the blockchain system 120, then the node 160a may send the claim information to a legal or subrogation agency. Otherwise, the node 160a creates a new claim in the blockchain system 120. For the new claim, all the claim information (e.g., entire file) of the claim may be stored in the ledger 165a of the node 160a. This may include documents including notes, pictures, and attachments. The documents may be in different formats. For example, notes may use *.rtf or *.pdf file formats, images may use *.GIF or other formats, other attachments like police reports, assessment reports, garage quotes, etc. can use *.doc, *.docx, or *pdf file formats. In this process, the node 160a may also connect with third party systems 150, such as weather, service providers like Garage, or credit bureau for credit reports and DPL to receive claim information. If the claim information is for an existing claim, then the claim information (e.g., including any new notes, pictures, and attachments) is stored in the ledger 165a of the node 160a.

After the claim information is stored in ledger 165a of node 160a, the node 160a sends 308 a request to a node 160b of the insurance carrier B to provide a notification regarding the claim. The request may include the claim information stored in the node 160*a*. For example, When the claim is populated into the blockchain system 120, the claim information is shared between all the parties of the claim, and they receive notification for the new claim. If any of the parties make changes in the claim information, there is a new copy created for the claim and shared across all the parties as new active data. When parties get notified about the claim and associated attachments, they can review the information in their node 160. If a party makes changes to the claim information, a new copy of the claim information is created and reflected in each node 160.

If the insurance carrier B accepts the claim information (e.g., doesn't make any changes), then the node 160*b* creates the claim in the node 160*b* by storing 312 the claim information in the ledger 165*b* of the node 160*b*. Furthermore, the other nodes 160 of the blockchain system 120 are synchronized 316 with the information. The node 165*b* sends a notification to the other nodes 160 of the blockchain system 120 regarding the acceptance, including the node 165*a* of the insurance carrier A, and the data in the ledgers 165 are synchronized. Here, the receiving and acceptance of the claim information represents a transaction that changes the state of the smart contract 115. This transaction is stored as a block in the ledgers 165 of the nodes 160. In some embodiments, the node 160*b* creates a block hash using the claim information after accepting the claim information, and this block hash is stored as part of the data of the block in the ledgers 165. The block hash of the previous block may also be stored in the part of the data of the new block. In some embodiments, the blockchain system 120 includes a central monitoring system that monitors data replication to all the parties (Nodes 160). If any data comes, a hash gets created by the central party (Notary) and register, all the associated parties for the record are available with the central party. Central party monitors the data replication to all the parties.

If the insurance carrier B rejects the transaction request, then this is communicated back to the node 160*a* of the insurance carrier A, as well as some or all of the other nodes 160. Here, the claim information of the claim is removed 314 from the ledgers 165 of the nodes 160.

After the claim is created in the ledger 165*b* of the node 160*b* the insurance carrier B, insurance carrier B will have option to pay for settlement with insurance carrier A or dispute the claim via notes, attachments, or pictures. The node 160*b* via execution of the smart contract 115 passes this message via to the node 160*a* of insurance carrier A. The communication between the nodes 160 of the insurance carrier B and the insurance carrier A may be in real-time according to the code stored in the smart contract 115. In some embodiments, notes and activities get parsed and persisted in the document storage system 125.

Smart contract 115 may also infuse with the claims coming from the insurance carrier A and consolidate this data with other external service providers like weather or garages. For example, if an accident happened at a certain time and the claimant has described the cause of accident as slippery road and rain, this external data would validate and confirm the rain and slippery road during the date and time of the accident. This would provide insurance carrier A confirmation about the incident and the cause of accident. Smart contracts 115 configure the nodes 160 to connect to these external third-party systems and store data into their ledgers 165. This data can be utilized by any carrier, TPA, subrogation, banks, recovery, legal or any other agencies for further the investigation.

Figure 4:
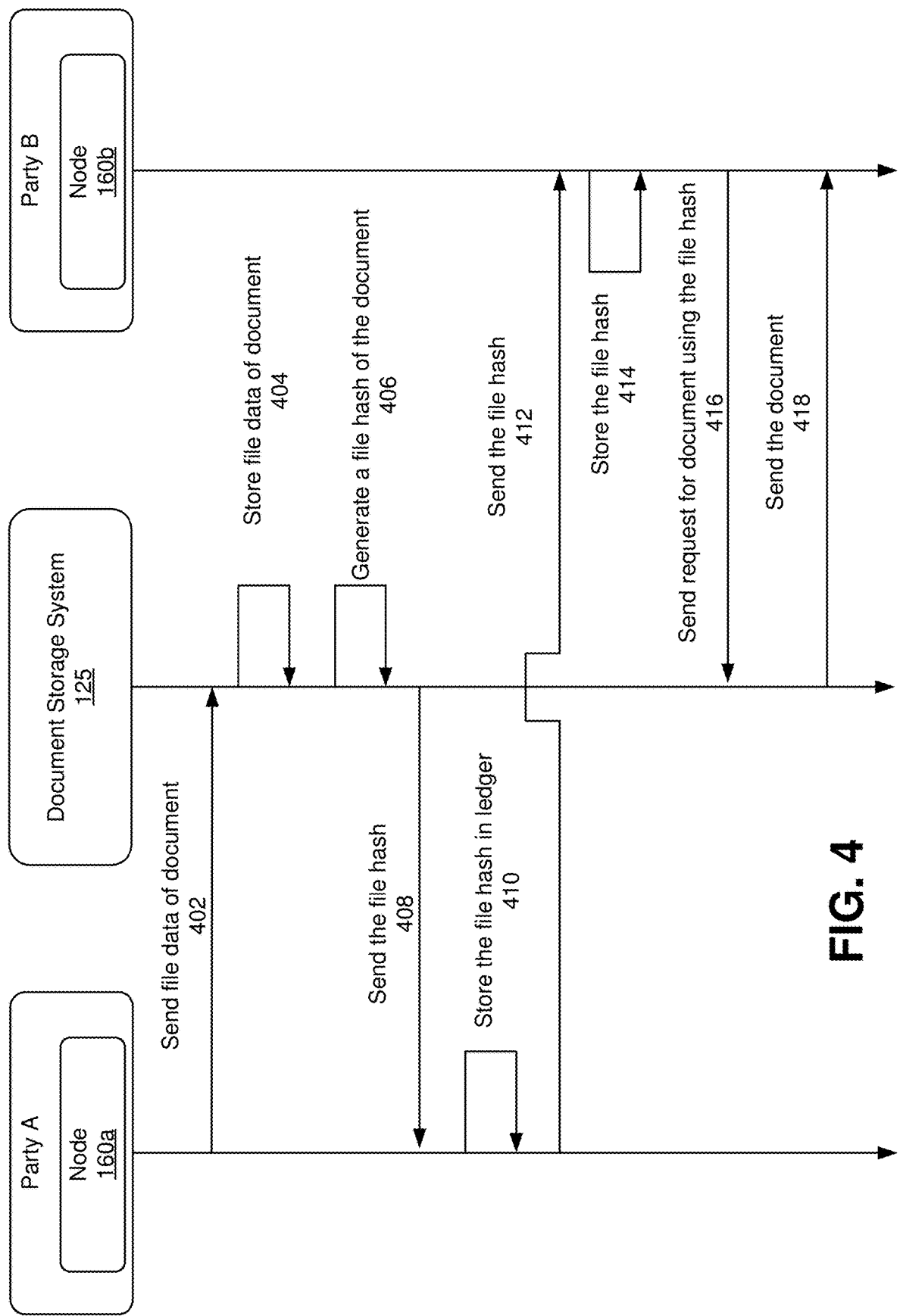
FIG. 4 is a flow diagram of a process for document sharing by nodes in a blockchain system through the document storage system, in accordance with one or more embodiments.

FIG. 4 is a flow diagram of a process for document sharing by nodes 160 in a blockchain system 120 through the document storage system 125, in accordance with one or more embodiments. The process may include fewer or additional steps, and steps may be performed in different orders. In this process, a party A (e.g., insurance carrier A) uploads a document to the document storage system 125 and a party B (e.g., insurance carrier B) downloads the document from the document storage system 125. By using the document storage system 125 to facilitate document sharing, the nodes 160 of the blockchain system 120 do not have to locally store (e.g., in the ledgers 165) the documents associated with transactions or claims. The document storage system 125 may include one or more document storage servers 140 and one or more document storage databases 145 that perform the process.

A node 160*a* associated with a party A sends 402 file data of a document to the document storage system 125. The file data may be data for a new document or an update to an existing document. The node 160*a* may receive the file data from a user device 105*a* associated with party A. The node 160*a* may execute code of a smart contract 115 stored in the ledger 165*a* of the node 160*a* that configures the node 160*a* to upload the file data to the document storage system 125 for sharing of the document with other parties in response to receiving the file data from the user device 105*a*. The receiving of the file data by the node 160*a* and the sending of the file data to the document storage system 125 by the node 160*a* may be a transaction that results in a change in the state of the smart contract 115, which may be recorded in the ledger 165*a* and distributed to the ledgers 165 of nodes 160 of other authorized parties.

The node 160*a* may send the file data to the document storage server 140 securely by calling an API exposed by the document storage server 140. For example, an API client on the node 160*a* may send the file data using a Hypertext Transfer Protocol (HTTP) POST method. The file data may include a file name, file content, and a file identifier. In some embodiments, the node 160*a* generates the file identifier such that it is unique from other file identifiers stored in the ledger 165*a*.

The document storage system 125 stores 404 the file data in a file system of the document storage system 125. To provide security, the document storage server 140 may encrypt the file data. The document storage server 140 stores the encrypted file data in the file system of the document storage database 145. The file system may include a hierarchy of folders and files stored in the folders. For example, the file system may include a hierarchy of folders including folders for different parties at a first level, folders for claims involving each party at a second level lower than the first level, and folders for different types of documents for each claim at a third level lower than the second level. The file data for the document may be stored in one of the folders of the file system according to the hierarchy and at a location in the file system as defined by a file path.

The document storage system 125 generates 406 a file hash of the document using the file data. The file hash may include one or more components. In some embodiments, the file hash includes a content hash generated by applying a hash function to the file content. The file hash may also include a folder hash generated by applying a hash function to the file path and/or folder name that references the stored location of the file content within the file system. The file hash and folder hash may be generated using the same hash function or different hash functions. The file hash may be an immutable file hash that cannot be changed after it has been generated. For example, the file hash gets created inside document storage system 125 on the request for uploading the document. There may be no other operations available to make any changes in file data, and thus the generated file hash becomes immutable because there is only one operation to create the file hash.

The document storage system 125 sends 408 the file hash of the document to the node 160a. As such, the document storage system 125 sends the file hash for the document in response to receiving the document.

The node 160a stores 410 the file hash in a ledger 165a of the node 160a. The file hash provides a reference to the file data of the document that the node 160a can share with other nodes 160. The node 160a may also store the file identifier of the document in the ledger 165a in association with the file hash. The node 160a may store the file hash and the file identifier in the ledger 165a as configured by the smart contract 115.

The node 160a sends 412 the file hash to a node 160b of a party B. In connection with sending the file hash, the node 160a may also send other information such as the file identifier. The nodes 160a and 160b are nodes of a blockchain system 120. The nodes 160 use ledgers 165 that are synchronized with each other, and thus the blockchain system 120 is also referred to as a digital ledger technology (DLT) network. The node 160a may send the file hash and any additional information to the nodes 160 of other parties in the form a DLT transaction. For example, the smart contract 115 stored in the ledger 165a of the node 160a configures the node 160a to store the file hash and other information in the ledger 115a and provide the file hash and other information to nodes 160 of one or more authorized parties in response to receiving the file hash from the document storage system 125. The smart contract 115 may specify the other parties that are authorized to access the document and thus receive the file hash. The receiving of the file hash by the node 160a and the sending of the file hash to the other nodes 160 may be a transaction that results in a change in the state of the smart contract 115. This transaction may also be recorded in the ledger 165a of the node 160a and distributed to the ledgers 165 of the nodes 160 of other parties.

The node 160b stores 414 the file hash in a ledger 165b of the node 160b. The node 160b may also store the asset details and file identifier received from the node 160a in the ledger 165b. For example, the node 160a may store the file hash of the document in a block of the ledger 165a implemented on the nodes 160a. In response to receiving the file hash from the node 160a, the node 160b may store the file hash in a copy of the block in the ledger 165b. As such, the block is synchronized in the ledgers 165a and 165b. The block may be synchronized on one or more other nodes 160 in a similar fashion. For example, the block may be copied across all of the ledgers 165, with immutability maintained by a notary node. In some embodiments, the node 160a generates a block hash for the first block using the file hash as data content of the block. The node 160b generates a block hash for the second block using the file hash as data content of the block. The asset details and file identifier may also be used to generate the block hashes.

The node 160b sends 416 a request for the document to the document storage system 125 using the file hash. The node 160b may send the request to the document storage server 140 securely by calling an API exposed by the document storage server 140. For example, an API client on the node 160b may send request using an HTTP GET method. The request may also include the file identifier for the document.

The document storage system 125 sends 418 the document to the node 160b. For example, the document storage server 140 identifies and retrieves the file content of the requested document from the document storage database 145 using the file identifier. The document storage server 140 may further generate the file hash for the document (e.g., including content hash and folder hash) and compare the generated file hash to the file hash received from the node 160b. If the file hashes match, then the document storage server 140 sends the document to the node 160b. The API client of the node 160b downloads the file and uses the document for further processing, such as providing the file to a user device 105b. The node 160b may also provide the document to a user device 105b associated with the Party B.

Although FIG. 4 shows a single party B receiving the file hash and the document, the file hash by provided to multiple parties and used by those parties to retrieve the document from the document storage system 125 as discussed herein with respect to the party B.

Figure 5:
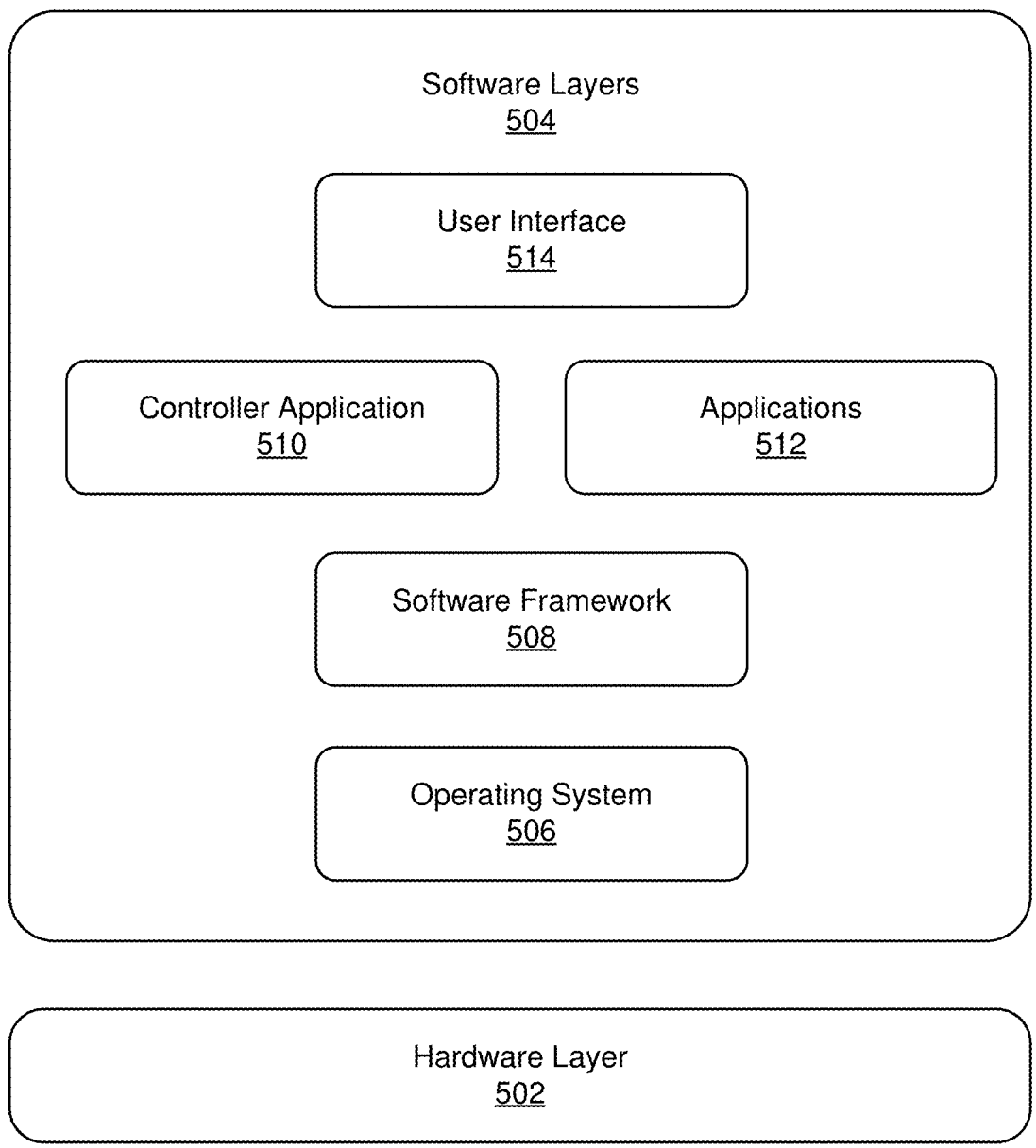
FIG. 5 is a block diagram of a node, in accordance with one or more embodiments

FIG. 5 is a block diagram of a node 160, in accordance with one or more embodiments. Some embodiments of the node 160 may include different components from those discussed herein. Similarly, in some cases, functions can be distributed among the components in a different manner than is described here.

In some embodiments, the node 160 is a proxy carrier that includes one or more servers of a cloud computing system. The hardware layer 502 may include processing, storage, and networking resources. These resources may be distributed across multiple geographical regions. The software layers 504 include an operating system 506, a software framework 508, a controller application 510, applications 512, and a user interface 514. The operating system 506 that supports the basic functions of the node 160, such as scheduling tasks, executing the application controller 510 and applications 512, and controlling peripherals for interacting with the user interface 514. The software framework 508 includes software that provides generic functionality that can be used by the application controller 510 or applications 512. The application controller 510 controls the flow of the applications 512. The applications 512 are programs that execute on the node 160 and may execute the program code of smart contracts 115. The user interface 514, which may be components of the applications 512, allows users to communicate with the applications 512. The hardware layer 502 and software layers 504 enable the node 160 to communicate with the other nodes of the blockchain system 120 via execution of smart contracts 115. The blockchain system 120 may execute on one or more distributed nodes 160 and may include one or more smart contracts 115 and a distributed ledger 165.

Document Redaction

In some embodiments, the nodes 160 of the blockchain system 120 perform document redaction. The document redaction may be performed in accordance with instructions defined in smart contracts. For example, a node 160 uses an optical character recognition (OCR) process to identify text in a document. The node 160 determines redaction data (e.g., also referred to as PII/PHI words).

Some challenges of document redaction include extracting data from image/pdf format and identifying PII/PHI words from the text. Many institutions share business documents with their partners and collaborate in each other's businesses. A challenge during documents sharing is hiding critical business information from the partners and their users. In some embodiments, JavaScript (JS) libraries provide for drawing a box (e.g., around the important phrases/statements) or removing boxes, such as by using mouse cursor. Also, the JS libraries capture the coordinates for each block on UI and the upload to the server for producing blocks on the documents. The file information is stored in ledgers 165 of the blockchain system 120.

Figure 6:
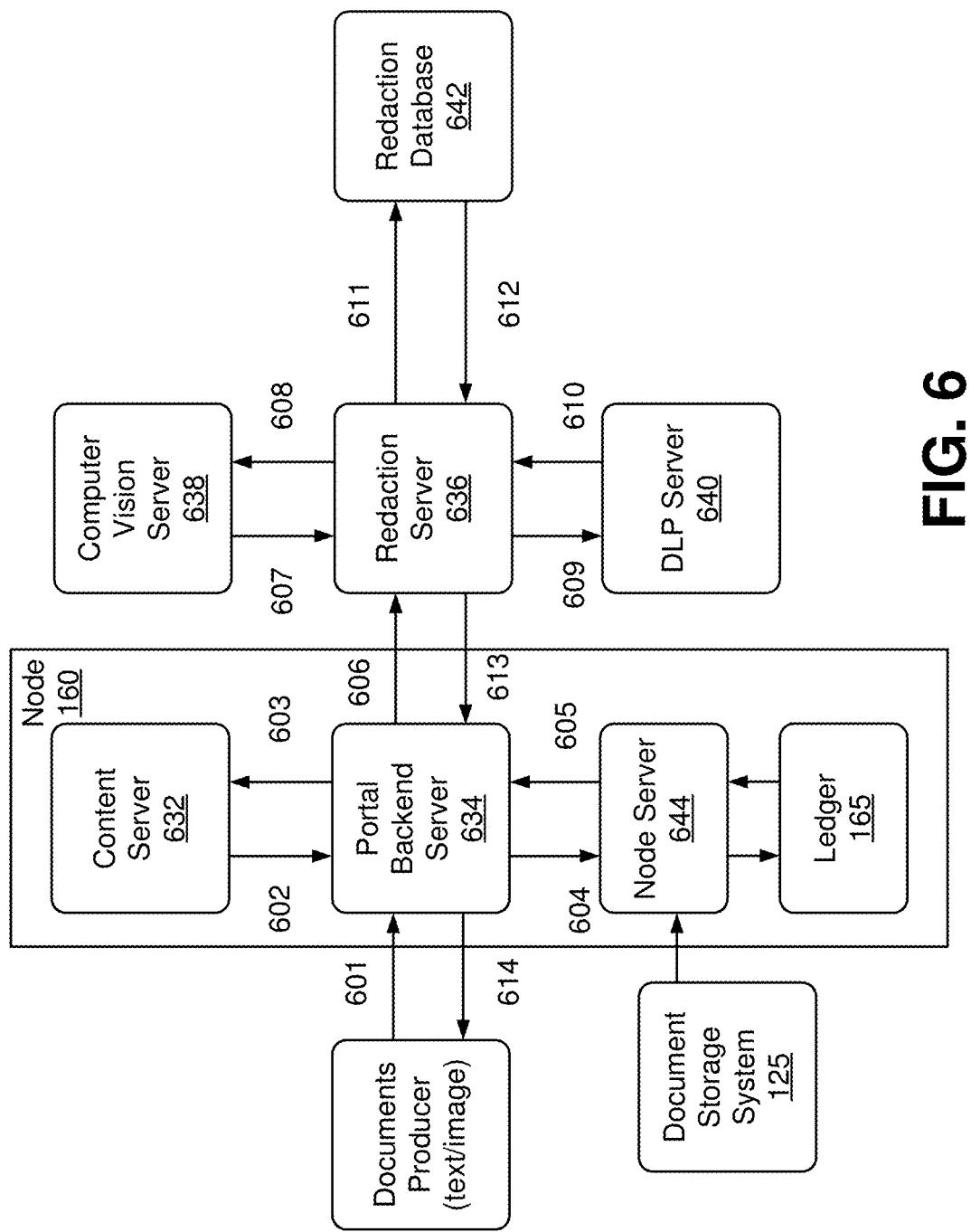
FIG. 6 is a flow diagram of a process for text data and redaction data extraction for a document, in accordance with one or more embodiments.

FIG. 6 is a flow diagram of a process for text data and redaction data extraction for a document, in accordance with one or more embodiments. The node 160 includes one or more servers, as shown by the content server 632, portal backend server 634, redaction server 636, and node server 644. The node 160 also includes one or more databases, as shown by the ledger 165 and the redaction database 642. The node 160 communicates with a computer vision server 638 and a data loss prevention (DLP) server 640, which may be shared across multiple nodes 160 of the blockchain system 120. In some embodiments, the node 160 may also include the computer vision server 638 and the DLP server 640. Each server shown in FIG. 6 may be implemented using multiple servers and each database shown may be implemented using multiple databases. The process may include fewer or additional steps, and steps may be performed in different orders.

A document is uploaded 601 to the content server 632 by calling an API of the portal backend server 634. The content server 632 and portal backend server 634 may be servers on a node 160 of the blockchain system 120. A user device 105 of a user may upload the document to the content server 632. The user may be the producer of the document. The document may include text or images (e.g., including images of text). The content server 632 may temporarily store the document the purpose of redaction and after redaction both the original and redacted document files are stored into document storage system 125. In some embodiments, the content server 632 is part of the document storage system 125.

The DLT ledger entry of the document is uploaded 602 to the content server 632, and the content server 632 sends 603 a response regarding successful upload through use of the API. The response may be sent as a confirmation to the portal backend server that the document has been uploaded to the content server 632.

The portal backend server 634 sends document information (e.g., including file data) to a node server 644 for storage in a ledger 165. The node server 644 of the node 160 executes smart contracts 115 and performs functionalities in accordance with the program code in the smart contracts 115. The node server 644 is connected to the ledger 165 of the node 160 to write data to the ledger 165 and read data from the ledger 165.

The node server 644 sends 605 a file hash of the document to the portal backend server 634. For example, the node server 644 provides the document to the document storage system 125. The document storage system 125 stores the document, generates the file hash, and provides the file hash to the node server 644 for storage in the ledger 165. The node server 644 then provides the file hash to the portal backend server 634. In some embodiments, the portal backend server 634 is a single interface for the internal applications and external applications to communicate. To communicate to the ledger, from the document storage system 125, APIs are exposed from backend server 634 and all the parties are consuming that API.

The portal backend server initiates 606 a data extraction process on the redaction server 636. The redaction server 636 manages the redaction process for the document. The redaction server 636 and redaction database 642 may be shared across the nodes 160 of the blockchain system. In some embodiments, the redaction server 636 and redaction database 642 are part of the document storage system 125. In some embodiments, each node 160 includes a redaction server 636 and redaction database 642.

The redaction server 636 sends 607 a request for text data extraction with computer vision server 638, and the redaction server 636 receives 508 text data from the computer vision server 638. The computer vision server 638 performs an optical character recognition (OCR) process to generate the text data from the document. The computer vision server 638 may be located on the node 160 or may be part of a separate system that is called by the redaction server 636 (e.g., OCR as a service). Multiple nodes 160 of the blockchain system may share a computer vision server 638 and/or call the same OCR service.

The redaction server 636 sends 609 a request for redaction data to the DLP server 640 and receives 610 the redaction data from the DLP server 640. The request may include the text data of the document. The DLP server 640 scans and classifies the text data to determine the redaction data defining instances of PHI/PII words in the document. The DLP server 640 may be located on the node 160 or may be part of a separate system that is called by the redaction server 636 (e.g., redaction data determination as a service).

The redaction server 636 sends 611 sends the text data and the redaction data of the document to a redaction database 642 and receives 612 a response from redaction database 642 regarding success or failure of the data storage. The redaction database 642 may be located on the node 160.

The redaction server 636 sends 613 a response to the portal backend server 634 to the data extraction process initiated at 606. The response 613 may use API and may include the text data and redaction data of the document. The portal backend server 634 sends 614 response for user view of the text data and redaction data, such as to a user device 105.

Figure 7:
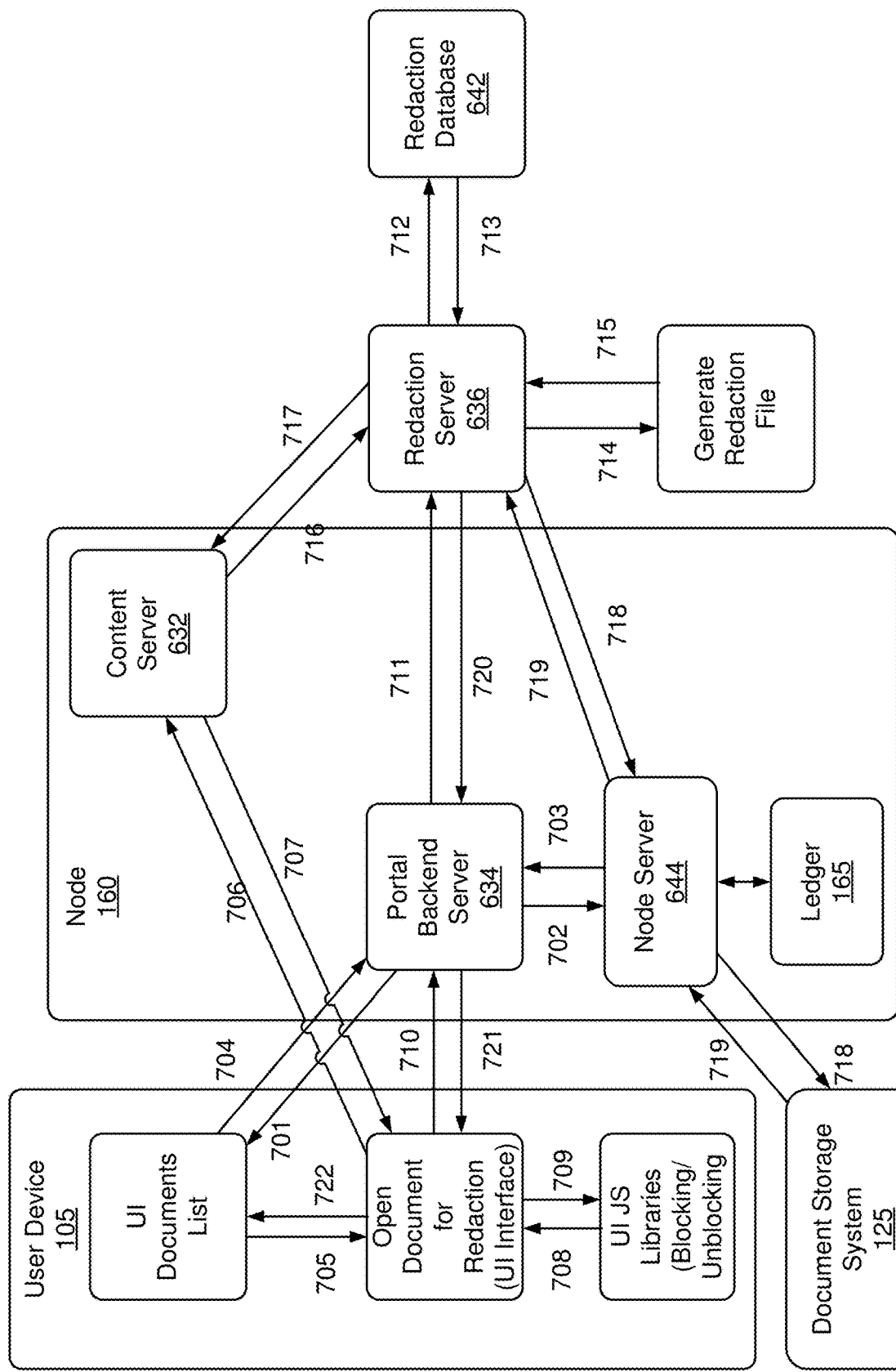
FIG. 7 is a flow diagram of a process for file redaction for a document, in accordance with one or more embodiments.

FIG. 7 is a flow diagram of a process for file redaction for a document, in accordance with one or more embodiments. The process may include fewer or additional steps, and steps may be performed in different orders.

A user device 105 sends 701 a request for a document list of a claim to the portal backend server 634 of a node 160. The user device 105 may use an API call to send the request.

The portal backend server 634 sends 702 a back-end API call to the node server 644 for the document list of the claim and receives 703 the document list from the node server 644. For example, the node server retrieves the document list from the ledger 165 of the node 160.

The portal backend server 634 sends 704 the document list to the user device 105. The user device 105 opens 705 the document to be redacted from the document list. For example, the document list may be presented on a (e.g., web) user interface that allows the user to select the document for redaction.

The user device 105 sends 706 a request to the content server 632 for the document and receives 707 the document from the content server 632. The document may include the text data and the programmatically generated redaction data, as discussed in connection with FIG. 6.

The user device 105 opens 708 the document using a Javascript library. The user interface allows the user to interact 709 with the document, such as boxing and unboxing the text data of the document to generate user defined redaction data. The user defined redaction data may include updates to the programmatically generated redaction data. Boxing results in new PHI/PII words being added to the redaction data, while unboxing removes PHI/PII words from the redaction data.

The user device 105 calls 710 an API of the portal backend server 634 to redact the document including the boxing and unboxing performed by the user of the user device 105.

The portal backend server 634 calls 711 the redaction server 636 to update the document with the user defined redaction data. The redaction server communicates with the redaction database 642 and the document storage system 125 to update the document.

The redaction server 636 checks 712 the text data and redaction data stored in the redaction database 642 and updates 713 the state of the document redaction stored in the redaction database 642. The state of the document redaction defines different stages of redaction process, such as completion of OCR, extraction of JavaScript Object Notation (JSON) file format, or completion of file redaction.

The redaction server 636 sends 714 a request for generation of a new redacted document and receives 715 a response for the redacted file generation process. The redacted file may be generated by a service that executes on the redaction server 636 or a separate server.

The redaction server 636 uploads 716 the redacted document to the content server 632 and receives 717 a response from the content server 632 indicating success or failure of the document upload. The uploading may include using an API call.

The redaction server 636 sends 718 a request for a file hash for the redacted document from the document storage system 125. This file hash may be different from the previous version of the file hash associated with the previous version of the document. The request may be sent to the document storage system 125 via the node server 644, or directly from the redaction server 636. The request may include the redacted document. The document stage system 125 generates the file hash using the redacted document and sends 719 the file hash to the redaction server 636 (e.g., via the node server 644).

The redaction server 636 sends 720 a response to the portal backend server 634. The response is to the request at 711 to redact the document from the portal backend server 634 to the redaction server 636. The portal backend server 634 sends 721 a response to the user device 105. The response is to the request at 710 to redact the document from the user device 105 to the portal backend server 634. These responses may include an indication that the document has been updated with the user defined redactions. The responses may further include the redacted document, which may be displayed in the user interface of the user device 105.

Document Classification

In some embodiments, the nodes 160 of the blockchain system 120 perform document classification. For example, each node 160 may include a document classification system (DCS) that performs the document classification. The document classification may include labeling documents uploaded the documents using natural language processing (NLP) techniques. The labels to documents may be generated by extracting information from the documents stored in the blockchain ledger. The system 120 may store the information on the document to retrain itself based on the continuous feedback learning process.

This functionality works for categorization of documents. From a user interface when user upload a document, the document is divided into multiple categories using a ML model. A user interface also allows a user to perform more operations on categorized documents, such as moving pages into document files of a different category or moving pages into different document files within the same category.

The document classification uses the huge amount of the document data present in the blockchain system 120 to provide a system to the end user which can provide almost advance level segregation of each document without requiring (e.g., any) manual intervention. To achieve this kind of advancement in the system, a combination of blockchain and NLP is used Example embodiments provide a document classification system configured to generate labels for documents via classification via text analysis. Some examples of these classifications for insurance claims include a Payment Proof Report or an Investigation Report.

The use of meta-information such as dates, page headings and page numbers in the corpus of the words that are created by use of OCR are used to passed to the deep learning models that execute on the top of blockchain technology, to leverage the advancement in the deep learning technology to generate labels for each document which is present in the system. The learning of the deep learning models may be based on machine learning platform libraries (e.g., TENSORFLOW) to converge user feedback, business rules and document meta-information together. The continuous learning pipelines are developed on the top of the blockchain based storage system together with high performance feedback application to collect all the information to improve the efficiency of the document classification system in the process to make it self-sufficient.

The document present in the distributed ledger 165 of the blockchain system 120 is attached to the meta-data related to that particular file which are maintained by various parties involved in the system. This information acts as a catalyst to overcome the multi-classified data problem where the text extraction through OCR and NLP gives this DLT based document classification system an advantage over generalized document classification.

Figure 8:
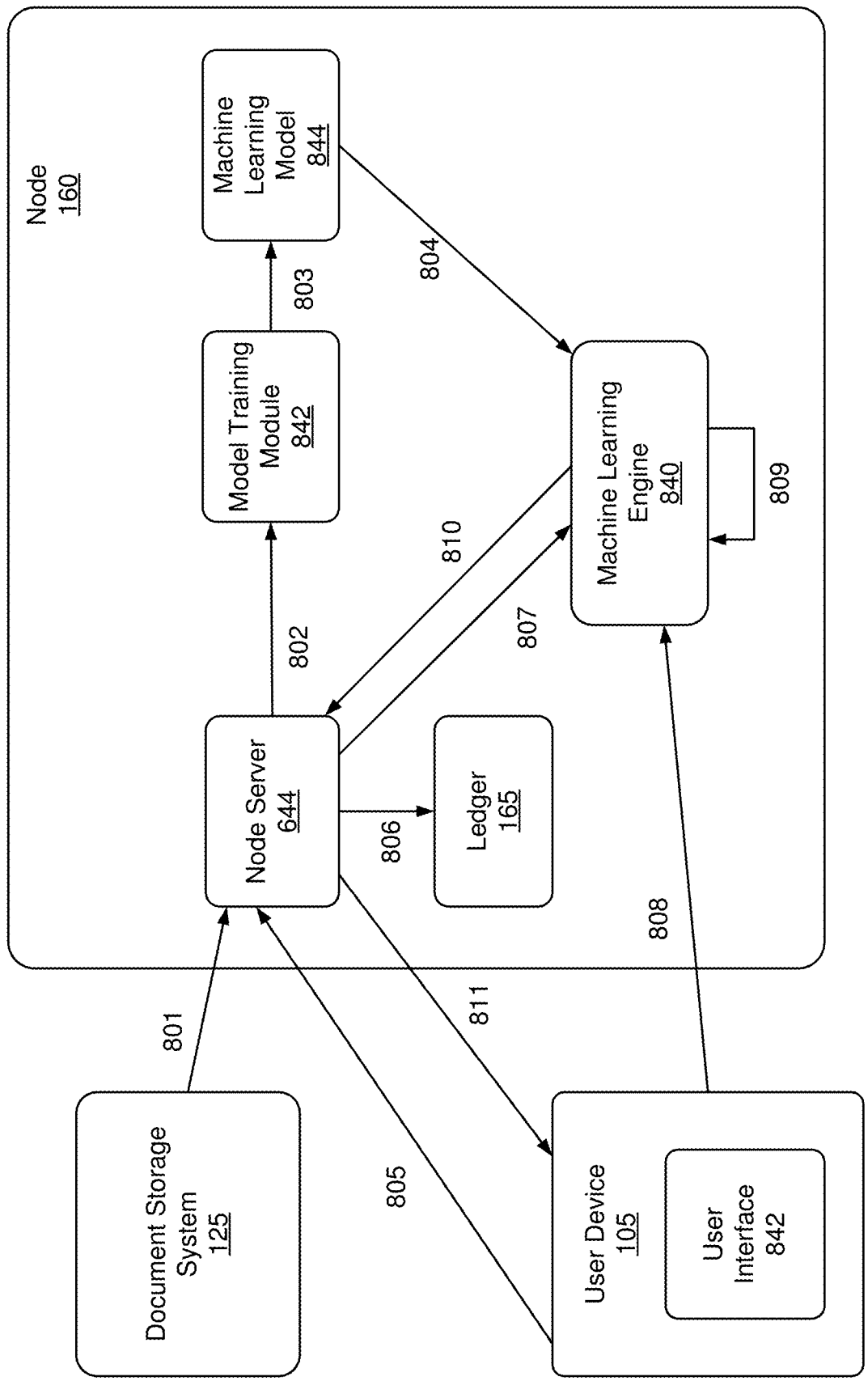
FIG. 8 is a flow diagram of a process for document classification, in accordance with one or more embodiments.

FIG. 8 is a flow diagram of a process for document classification, in accordance with one or more embodiments. The node 160 includes a model training module 842 that trains a machine learning model 844 for performing the document classification, and a machine learning engine 840 that executes the deep machine learning model 844 for inferencing in document classification tasks. The process may include fewer or additional steps, and steps may be performed in different orders.

A node server 644 of the node 160 extracts 801 multi-level meta-information about documents stored in the document storage database 125 and document files (e.g., in pdf format) of the documents. The multi-level meta-information of a document may include labels or classifications of the documents. The meta-information may include dates, page headings and page numbers of documents. Multi-level meta-information may include the information that is attached to the claim when it enters the system (e.g., type of claims, amount of recovery etc.). The meta-information acts as an additional feature to the modeling input. The multi-level meta-information may be extracted using PostgreSQL databases in the document storage database 125. The document files may be extracted from the document storage databases 125 using a script. The node server 644 provides 802 the multi-level meta-information and the document files of the documents to the model training module 842.

The model training module 842 converts 803 the document files to text data suitable to train the machine learning model 844 and merges the text data with the multi-level meta-information. Conversion of the document file into the text data may include using the OCR service provided by the computer vision server 638. In some embodiments, the machine learning model is a deep learning model with an input layer, multiple intermediate layers, and an output layer. These layers are interconnected with each other, with the weights and biases associated with connections between the nodes in adjacent layers being determined based on the training. The training may include using training data (e.g., the documents) to generate classification results with the machine learning model 844, determining an error function between the classification results and ground truth classifications, and a using a gradient descent is used to minimize the error function by changing the weights and biases of the connections between nodes.

The trained machine learning model 844 is deployed 804 on the machine learning engine 840 (e.g., one or more servers). The deployment may be performed using FLASK APIs.

The user interface 842 of the user device 105 sends 805 a document to the node server 644 of the node 160, which is stored 806 in the ledger 165 by the node server 644. The node server 644 may send the document to the document storage system 125 for sharing with other nodes 160.

The node 644 sends 807 the document from the ledger 165 to the machine learning engine 840 for document classification. The document may be provided using an API call based on FLASK server.

The user interface 842 of the user device 105 sends 808 input about the document to help the machine learning engine 840 perform the classification. The input may be provided by the user of the user device 105 via the user interface 842. For example, input is provided to the model to predict desired output. These inputs are based on feature engineering on the historical data. This data contains text, as well as the meta information. Furthermore, this input includes additional information from the client. The text, meta-information and inputs provide a consolidated input to the model.

The machine learning engine 840 creates 809 one or more classified documents from the document. The classified documents may each include a document type. Different types of documents may be located in different folders of a file system. In one example, a single document may be split into multiple documents. These documents may be of the same type or different types. In another example, multiple documents may be merged into a smaller number of documents, such as a single document. In some embodiments, the classified documents are created based on the modified and customized PyPDF libraries backend applications and uploaded to the ledger 164 as response to an API call which is available to each user device 105 connected to the node 160 on the spot.

The machine learning engine 840 sends 810 the one or more classified documents to the node server 644. The node server sends 811 the one or more classified documents to the user device 105, such as for display in the user interface 842. The user interface 842 may show the one or more documents, their classifications, and the folder structure of the documents.

Figure 9:
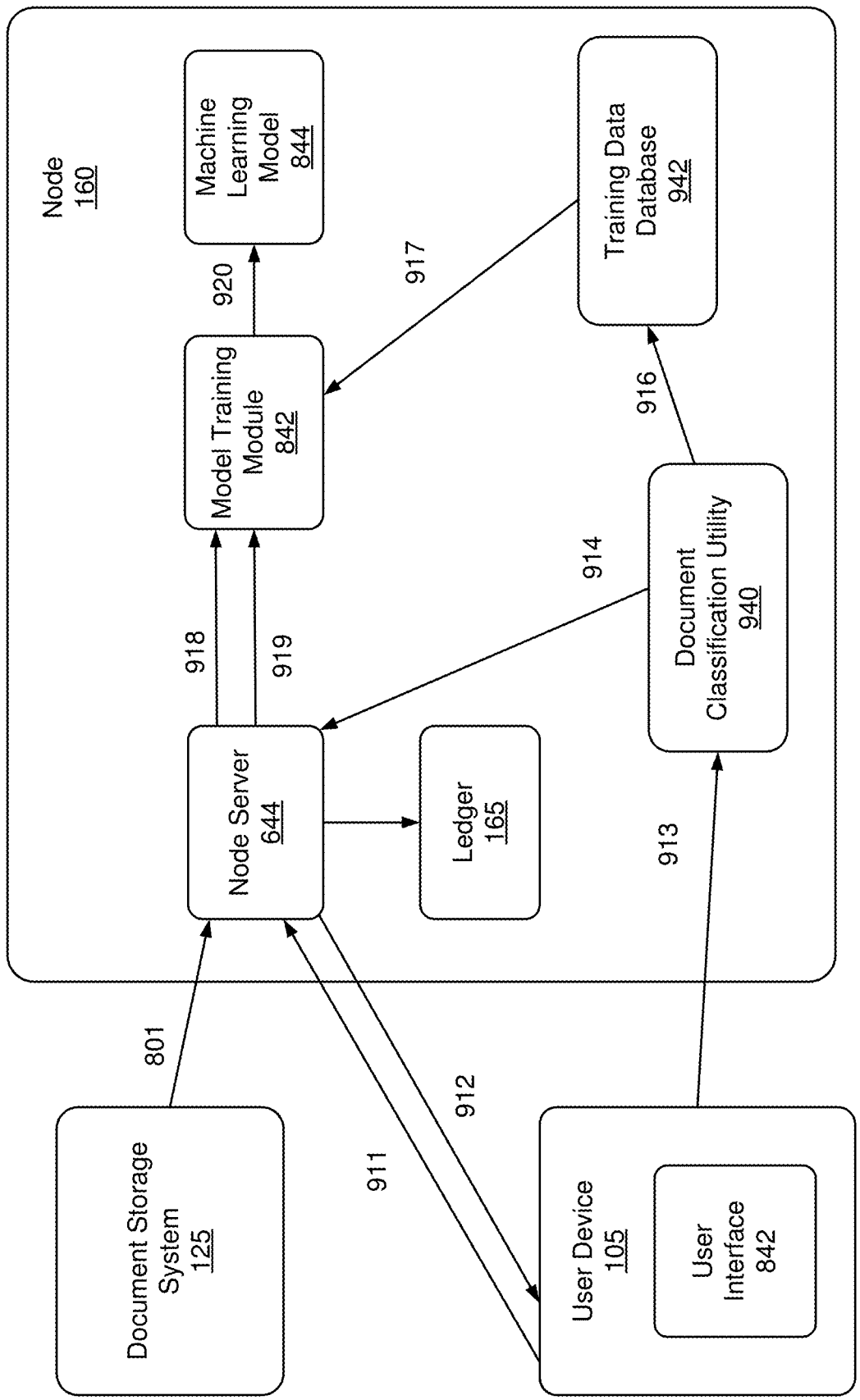
FIG. 9 is a flow diagram of a process for training a machine learning model for document classification based on feedback, in accordance with one or more embodiments.

FIG. 9 is a flow diagram of a process for training a machine learning model for document classification based on feedback, in accordance with one or more embodiments. The process may include fewer or additional steps, and steps may be performed in different orders.

A user device 105 sends 911 a document to a node server 644 of a node 160. The document may be sent via API calls. The node server 644 stores the file in the document storage server 125 and/or ledger 165.

The node server 644 shows 912 the document in the user interface 842. This may be sent via API call response. This user interface 842 may include an indication of the document being separated into multiple documents and include programmatic classifications of the documents by the machine learning engine 840 as discussed in connection with FIG. 8.

The user device 105 sends 913 information for adjusting pages of the document with feedback about the change via the user interface 842 of the user device 105 to a document classification utility 940. Information for adjusting pages means, that based on the context provided by users we can change the classification of these pages in future model and that helps them update the right classification of the folder for the documents. Based on the feedback taken on the screen, our model is being retrained and updated for the next set of files.

The document classification utility 940 sends 914 the updated document to the node server 644 for storage in the ledger 165. The document classification utility 940 calls an updated document custom API to update the document according to the information from the user device 105. After the file split document is reviewed by user, and saved the file then this updated file may be stored in the ledger 165 by the node server 644.

The node server 644 sends 915 the updated document to the user device 105 for display in the user interface 842.

The document classification utility 940 stores 916 the feedback from the user regarding the document to a training data database 942. The training data database 942 may include a NoSQL database. The feedback from the user may be used in a re-training pipeline for the machine learning model 844. In some embodiments the training data database 942 is separate from the node 160. Multiple (e.g., all) nodes 160 may share a centralized training data database 942.

The document classification utility 940 sends 917 the feedback and the original document to the model training module 842. This data may be passed using clean data application created in python using natural language toolkit (NLTK) and spacy libraries to feature engineering for maximum output for model.

The node server 644 sends 918 the updated document to the model training module 842. The model training module 842 may extract text data of the updated document using OCR, such as using OCR service calls built into text recognition scripts.

The node server 644 sends 919 meta-information about the document from the ledger 165 to the training module 842. The meta-information may be passed only directly to model using API calls and scripts. After the model is trained on meta information, then for each new request context or meta information will be passed as an input to the model deployed to the server to generate improved results.

The model training module 842 trains 920 the machine learning model 844. The mode training module 842 extracts all the information from all inputs and amalgamation is again used to upgrade the machine learning model 842. In some embodiments, a Long-Short Term Memory Deep modeling technique is used to train the machine learning module 842 to classify sequence of text into correct labels. Pre trained embeddings like glove may be used and trained over according to the collected data. The model training module 842 may use machine learning libraries (e.g., CUDA or TENSORFLOW) for the training pipelines.

Figure 10:
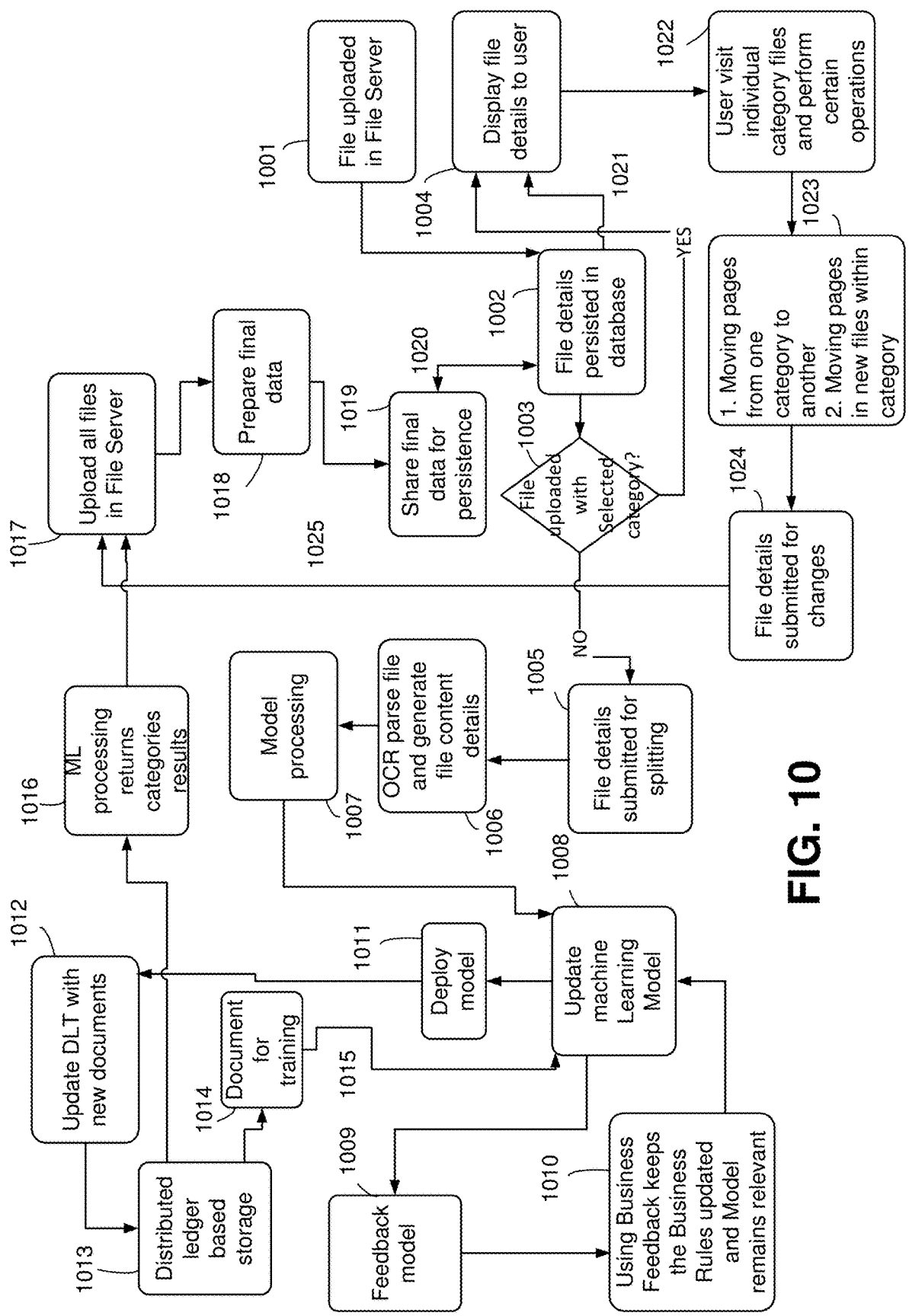
FIG. 10 is a flow diagram of an overall process for document classification, in accordance with one or more embodiments.

FIG. 10 is a flow diagram of an overall process for document classification, in accordance with one or more embodiments. The process may include fewer or additional steps, and steps may be performed in different orders.

A user device 105 uploads 1001 a document file (e.g., pdf file) of a document to a node 160 of a blockchain system 120. For example, a user of an application user interface 842 on the user device 105 uploads the document file. While uploading, the user can select a category for the document (e.g., thereby providing a classification for the document) or can upload the document without selecting a category. The files may be stored in the content server 632 (also referred to as a file server).

The document file is persisted 1002 into the document storage database 125 (e.g., a Postgres SQL database). For example, the node server 644 provides file details to the document storage database 125. The node server 644 may use a Consuming API call to upload the document file to the document storage database 125. The file details include the document file and the selected category if available. The consume API takes the file from the document storage system 125 and reads it for further processing. The consuming API resides into the node server 644.

The node server 644 determines 1003 whether the document file was uploaded with a selected category (or multiple categories). If updated document has a selected category, the file details (including document file and classifications) are displayed 1004 to user interface 842 of the user device 105. The user may have manually split the document into multiple documents and provided a category for each of the documents. In this case, no further file splitting needs to be done. Within the user interface 842, the user is provided with a display of the file and file details. The display may include a view of the file as the original file and as split files.

If the document file does not have a selected category, the node server 644 (consuming API) sends 1005 file data to portal backend server 634 for splitting. For example, the Consuming API sends the document file to the portal backend server 634.

Consuming API sends 1006 file data to computer vision server to parse file using OCR and generate file content details. The file content details may include text data of the document generated via OCR. For example, the portal backend server 634 may provide the file data to the redaction server 636 and the redaction server may call the computer vision server 638.

The file content details, including the text data generated using OCR, are processed 1007 for model processing for the file categorization. Some examples of the types of processing that may be used include stemming, Lemmatization and N-gram analysis. The processing may include generating multi-level meta-information about the document.

The multi-level meta-information about the document is transferred to the model training module 842, and the model training module 842 updates 1008 the machine learning model 844. For example, the node server 644 may extract the meta-information and send the meta-information to model training module 842, which uses the meta-information to train the machine learning model 844.

A feedback model us used 1009 to update the machine learning model 844. For example, the document file (e.g., portable document format (PDF)) is extracted using scripts. The node server 644 may extract the document from the document storage database 125. The model training module 842 may include a set of scripts that utilizes the computer vision server APIs to convert the document file (e.g., pdf file) to text data suitable to train the machine learning model 844 and merge the text data with the meta-information of the document. Using business feedback keeps the business rules updated 1010 and model remains relevant.

The trained machine learning model 844 is deployed 1011 on the machine learning engine 840 (e.g., a server) using the FASLK APIs. The machine learning engine 840 executes the machine learning model 844 to perform inferencing tasks for document classification.

The user interface 842 updates 1012 the blockchain system 120 (also referred to as DLT), with new documents. For example, the user interface 842 adds the documents to the DLT, such as by calling custom APIs. The documents are stored 1013 in the distributed ledgers 165 of the blockchain system 120.

The documents used for training the machine learning model 844 are sent 1014 from ledger 165 of a node 160 to the machine learning engine 840 with an API call response based on FLASK server. The user passes 1015 the input classified documents are created based on the modified and customized PyPDF libraries backend applications and uploaded to the ledger 165 as response to API call which is available to each client of the ledger 165 on the spot. For example, the machine learning engine 840 may be called for the classification for each page of a pdf, which information is then passed through customize by pyPDF libraries to split the original pdf.

The machine learning engine 840 classifies 1016 the documents using the machine learning model 844. The documents are provided to the machine learning engine 840 for classification from the distributed ledgers 165 of the blockchain system 120. The classification results in page details for each category.

All files, including classification results, are uploaded 1017 to the content server 632 of the node 160. Final data is prepared 1018 for persistence in the document storage database 125. The final data may include storing all information related to each file split, which is then used for model evaluation.

The node server 644 (Consuming API) sends 1019 the final data to the portal backend server 634 of the node 160.

The final data is inserted/updated 1020 in the document storage system 125. The document storage system 125 may include a Postgres SQL database server. As response of the API received details will persisted in Redis database. For example, information for and from the machine learning engine 840 may be are stored into the Redis database. Meta information from the client may be stored into Redis and meta information from the claim is coming out of Postgres system.

Consuming API call 1021 to get data to display on user interface 842. Via the user interface, the user selects 1022 files and checks the classification results. The user may visit individual category files and perform certain operations. For example, the user selects 1023 individual files to perform page operations from one category to another category or to another file within the category.

Consuming API submits 1024 files operation details for updating and changing files. Updates to the classification may be made by the user. The files are restitched 1025 and upload to the content server 632.

Example Computer System

Figure 11:
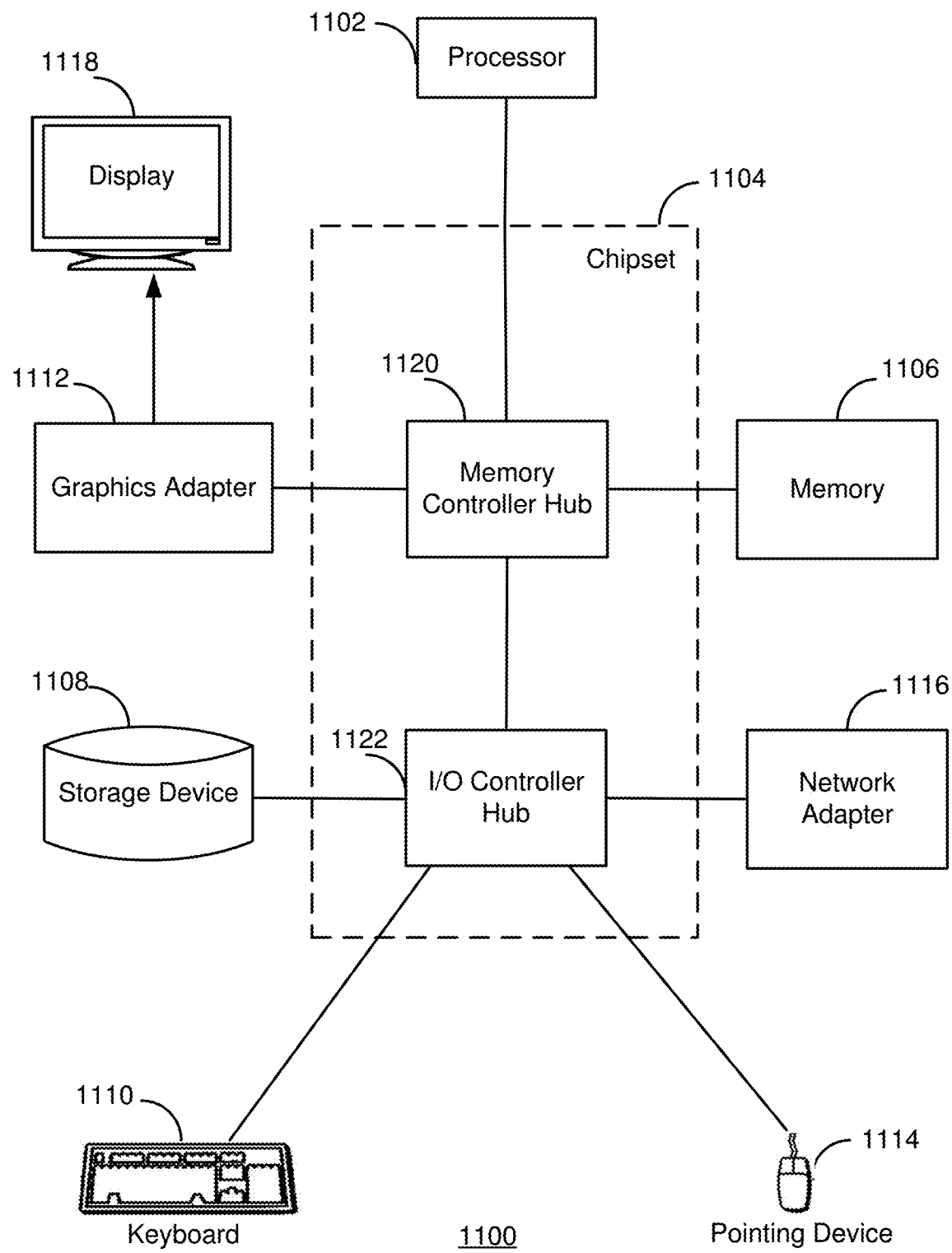
FIG. 11 is a block diagram of a computer system, in accordance with one or more embodiments.

FIG. 11 is a block diagram of a computer system 1100, in accordance with one or more embodiments. The computer system 1100 is an example of circuitry that implements the nodes 160 (e.g., including node server 644, content server 632, portal backend server 634, ledger 165, redaction server 636, redaction database 642, computer vision server 638, DLP server 640, machine learning engine 840, or model training module 842) of the blockchain system 120, the document storage server 140 or document storage database 145 of the document storage system 125, the user devices 105, or other components of the environment 100. Illustrated are at least one processor 1102 coupled to a chipset 1104. The chipset 1104 includes a memory controller hub 1120 and an input/output (I/O) controller hub 1122. A memory 1106 and a graphics adapter 1112 are coupled to the memory controller hub 1120, and a display device 1118 is coupled to the graphics adapter 1112. A storage device 1008, keyboard 1110, pointing device 1114, and network adapter 1116 are coupled to the I/O controller hub 1122. The computer system 1100 may include various types of input or output devices. Other embodiments of the computer system 1100 have different architectures. For example, the memory 1106 is directly coupled to the processor 1102 in some embodiments.

The storage device 1108 includes one or more non-transitory computer-readable storage media such as a hard drive, compact disk read-only memory (CD-ROM), DVD, or a solid-state memory device. The memory 1106 holds program code (comprised of one or more instructions) and data used by the processor 1102. The program code may correspond to the processing aspects described with FIGS. 1-10.

The pointing device 1114 is used in combination with the keyboard 1110 to input data into the computer system 1100. The graphics adapter 1112 displays images and other information on the display device 1118. In some embodiments, the display device 1118 includes a touch screen capability for receiving user input and selections. The network adapter 1116 couples the computer system 1100 to a network. Some embodiments of the computer system 1100 have different and/or other components than those shown in FIG. 11.

Circuitry that implements the systems and modules described herein may include one or more processors that execute program code stored in a non-transitory computer readable medium. The program code when executed by the one or more processors configures the one or more processors to perform the functionality described herein for an audio processing system or modules of an audio processing system. The one or more processors may include a central processing unit (CPU), a graphics processing unit (GPU), an application-specific integrated circuit (ASIC), a field-programmable gate array (FPGA), or other types of computer circuits.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one or more embodiments," or "an embodiment" means that a particular element, feature, structure, or characteristic described in connection with the embodiment is included in at least one embodiment. The appearances of these phrase in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuitry, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio enhancement using device-specific metadata through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Additional written description based on the principles herein include and are not limited to:

1. A method, comprising, by one or more servers:
   receiving file content of a document from a first node of a blockchain system;
   storing, in one or more databases, the file content;
   generating a file hash of the document by applying a hash function to the file content;
   transmitting the file hash of the document to the first node;
   receiving a request for the document from a second node of the blockchain system, the request including the file hash; and
   transmitting, in response to receiving the request including the file hash, the file content of the document to the second node.

2. The method of claim 1, further comprising, by the first node:
   executing program code stored in a smart contract; and
   transmitting the file hash to the second node based on the program code authorizing the second node to receive the document.

3. The method of claim 1, further comprising:
   storing, by the first node, the file hash of the document in a block of a first ledger of the first node; and
   in response to receiving the file hash from the first node, storing, by the second node, the file hash in a copy of the block of a second ledger of the second node.

4. The method of claim 3, wherein the file content of the document is not stored in the distributed ledger.

5. The method of claim 3, further comprising generating, by the first node, the block including a block hash created from the file hash.

6. The method of claim 1, wherein:
   the first node does not send the file content of the document to other nodes of the blockchain system; and
   the first node controls access to the file content of the document by sharing the file hash with at least a portion of the other nodes of the blockchain system.

7. The method of claim 1, wherein the first node sends the file content of the document and the second nodes sends the request for the document by executing program code stored in one or more smart contracts.

8. The method of claim 1, wherein the file hash includes:
   a content hash generated by applying the hash function to the file content; and
   a folder hash generated by applying the hash function or a different hash function to a file path that references a stored location of the file content within a file system of the one or more databases.

9. The method of claim 1, wherein the file content includes an update to an existing document stored in the one or more databases and the sending the document to the second node includes sending an updated document including the update defined by the file content.

10. The method of claim 1, further comprising, by the one or more servers, encrypting the file content stored in the one or more databases.

11. The method of claim 1, further comprising, by the one or more servers and in response to receiving the request including the file hash:
generating a second file hash using the file content stored in the one or more databases; and
comparing the second file hash with the file hash received from the second node, wherein the file content is sent to the second node in response to the file hash received from the second node matching the second file hash.

12. The method of claim 1, wherein:
the first node is associated with a first insurance carrier;
the second node is associated with a second insurance carrier;
the document includes information related to an insurance claim.

13. The method of claim 12, further comprising:
receiving, by the first node, the file content from a first user device associated with the first insurance carrier; and
sending, by the second node, the file content to a second user device associated with the second insurance carrier.

14. A system, comprising:
one or more databases; and
one or more servers configured to:
receive file content of a document from a first node of a blockchain system;
store, in the one or more databases, the file content;
generate a file hash of the document by applying a hash function to the file content;
transmit the file hash of the document to the first node;
receive a request for the document from a second node of the blockchain system, the request including the file hash; and
transmit the file content of the document to the second node in response to receipt of the request including the file hash.

15. The system of claim 14, further comprising the blockchain system including the first and second nodes, and wherein the first node is further configured to:
execute program code stored in a smart contract; and
transmit the file hash to the second node based on the program code authorizing the second node to receive the document.

16. The system of claim 15, wherein:
the first node is configured to store the file hash of the document in a block of a of a first ledger of the first node; and
in response to receiving the file hash from the first node, the second node is configured to store the file hash in in a copy of the block of a second ledger of the second node.

17. The system of claim 16, wherein the file content of the document is not stored in the distributed ledger.

18. The system of claim 16, wherein:
the first node does not send the file content of the document to other nodes of the blockchain system; and the first node is configured to control access to the file content of the document by sharing the file hash with at least a portion of the other nodes of the blockchain system.

19. The system of claim 14, wherein the file hash includes:
a content hash generated by applying the hash function to the file content; and
a folder hash generated by applying the hash function or a different hash function to a file path that references a stored location of the file content within a file system of the one or more databases.

20. A non-transitory computer readable medium comprising stored program code, the program code when executed by one or more processors configures the one or more processors to:
receive file content of a document from a first node of a blockchain system;
store, in one or more databases, the file content;
generate a file hash of the document by applying a hash function to the file content; transmit the file hash of the document to the first node;
receive a request for the document from a second node of the blockchain system, the request including the file hash; and
transmit the file content of the document to the second node in response to receipt of the request including the file hash.

What is claimed is:
1. A method, comprising: in a blockchain system comprising a first node and a second node, the first node associated with a first insurance carrier and the second node associated with a second insurance carrier:
receiving a file from the first insurance carrier, the file corresponding to an insurance document, the insurance document related to an insurance transaction that is automatically executable by a smart contract stored on the blockchain system, the smart contract comprising one or more conditions of the insurance transaction that are executable by automatic program instructions of the smart contract;
storing, in a data storage, file content of the file, wherein the data storage is outside of the blockchain system, wherein the data storage includes a hierarchy of folders and files that are organized based on insurance claims, the file being stored associated with a file path based on the insurance claims;
causing to generate a file hash of the insurance document, wherein generating the file hash comprises: generating a first hash component based on a file name of the insurance document, generating a second hash component based on the file path in the hierarchy of folders and files of the data storage, generating the file hash that includes the first hash component and the second hash component
recording the file hash of the insurance document in a distributed ledger of the blockchain system, wherein the file hash is used as an access identifier of the file content signifying that nodes possessing the file hash are authorized to access the file content stored in the data storage outside of the blockchain system;
receiving a request for the insurance document from the second insurance carrier;
authenticating the second insurance carrier at the second node through an application programming interface outside of the blockchain system;

inputting one or more parameters related to the second insurance carrier to the smart contract to determine whether the second insurance carrier satisfies the one or more conditions of the insurance transaction, wherein the smart contract, executing the automatic program instructions, determines that the second insurance carrier satisfies the one or more conditions of the insurance transaction;

causing, responsive to the smart contract determining that the second node satisfies the one or more conditions of the insurance transaction, a transmission of the file hash from the first node associated with the first insurance carrier to the second node associated with the second insurance carrier;

causing the second node to determine, based on the file hash, the file path of insurance document in the data storage; and responsive to the second node determining the file path, causing the data storage outside of the blockchain system to transmit the file content of the insurance document from the data storage to the second node associated with the second insurance carrier, wherein the file content is not transmitted directly between the first node and the second node.

2. The method of claim 1, wherein the file hash further includes:
   a content hash generated by applying a hash function to the file content; and
   a folder hash generated by applying the hash function or a different hash function to a file path that references a stored location of the file content within a file system of the data storage.

3. The method of claim 1, wherein the file content includes an update to an existing document stored in the data storage and the transmitting the file content of the insurance document to the second node includes transmitting an updated document including the update defined by the file content.

4. The method of claim 1, further comprising encrypting the file content stored in the data storage.

5. The method of claim 1, further comprising:
   generating a second file hash using the file content stored in the data storage; and
   comparing the second file hash with the file hash received from the second node, wherein the file content is sent to the second node in response to the file hash received from the second node matching the second file hash.

6. The method of claim 1, wherein:
   the first node is operated by the first insurance carrier; and
   the second node is operated by the second insurance carrier.

7. A system, comprising: one or more processors; and memory configured to store code comprising instructions, wherein the instructions, when executed by the one or more processors, cause the one or more processors to:
   receive a file from a first insurance carrier, the file corresponding to an insurance document, the insurance document related to an insurance transaction that is automatically executable by a smart contract stored on a blockchain system, the smart contract comprising one or more conditions of the insurance transaction that are executable by automatic program instructions of the smart contract, the blockchain system comprising a first node and a second node, the first node associated with the first insurance carrier and the second node associated with a second insurance carrier;
   store, in a data storage, file content of the file, wherein the data storage is outside of the blockchain system, wherein the data storage includes a hierarchy of folders and files that are organized based on insurance claims, the file being stored associated with a file path based on the insurance claims;
   cause to generate a file hash of the insurance document, wherein generating the file hash comprises: generating a first hash component based on a file name of the insurance document, generating a second hash component based on the file path in the hierarchy of folders and files of the data storage, generating the file hash that includes the first hash component and the second hash component;
   record the file hash of the insurance document in a distributed ledger of the blockchain system, wherein the file hash is used as an access identifier of the file content signifying that nodes possessing the file hash are authorized to access the file content stored in the data storage outside of the blockchain system;
   receive a request for the insurance document from the second insurance carrier;
   authenticate the second insurance carrier at the second node through an application programming interface outside of the blockchain system;
   input one or more parameters related to the second insurance carrier to the smart contract to determine whether the second insurance carrier satisfies the one or more conditions of the insurance transaction, wherein the smart contract, executing the automatic program instructions, determines that the second insurance carrier satisfies the one or more conditions of the insurance transaction;
   cause, responsive to the smart contract determining that the second node satisfies the one or more conditions of the insurance transaction, a transmission of the file hash from the first node associated with the first insurance carrier to the second node associated with the second insurance carrier;
   cause the second node to determine, based on the file hash, the file path of insurance document in the data storage; and
   responsive to the second node determining the file path, cause the data storage outside of the blockchain system to transmit the file content of the insurance document from the data storage to the second node associated with the second insurance carrier, wherein the file content is not transmitted directly between the first node and the second node.

8. The system of claim 7, further comprising the blockchain system including the first and second nodes, and wherein the first node is further configured to:
   execute program code stored in a smart contract; and
   transmit the file hash to the second node based on the program code authorizing the second node to receive the insurance document.

9. The system of claim 8, wherein:
   the first node is configured to store the file hash of the insurance document in a block of a first ledger of the first node; and
   in response to receiving the file hash from the first node, the second node is configured to store the file hash in in a copy of the block of a second ledger of the second node.

10. The system of claim 9, wherein the file content of the insurance document is not stored in the blockchain system.

11. The system of claim 9, wherein the first node is further configured to generate the block including a block hash created from the file hash.

12. The system of claim 9, wherein:
the first node does not transmit the file content of the insurance document to other nodes of the blockchain system; and
the first node is configured to control access to the file content of the insurance document by sharing the file hash with at least a portion of the other nodes of the blockchain system.

13. The system of claim 8, wherein the first node transmits the file content of the insurance document and the second node transmits the request for the insurance document by executing program code stored in one or more smart contracts.

14. The system of claim 7, wherein the file hash includes:
a content hash generated by applying a hash function to the file content; and
a folder hash generated by applying the hash function or a different hash function to a file path that references a stored location of the file content within a file system of the data storage.

15. The system of claim 7, wherein the file content includes an update to an existing document stored in the data storage and the transmitting the file content of the insurance document to the second node includes transmitting an updated document including the update defined by the file content.

16. The system of claim 7, wherein the instructions further cause the one or more processors to:
generate a second file hash using the file content stored in the data storage; and
compare the second file hash with the file hash received from the second node, wherein the file content is sent to the second node in response to the file hash received from the second node matching the second file hash.

17. One or more non-transitory computer-readable media configured to store code comprising instructions, wherein the instructions, when executed by one or more processors, cause the one or more processors to:
receive a file from a first insurance carrier, the file corresponding to an insurance document, the insurance document related to an insurance transaction that is automatically executable by a smart contract stored on a blockchain system, the smart contract comprising one or more conditions of the insurance transaction that are executable by automatic program instructions of the smart contract, the blockchain system comprising a first node and a second node, the first node associated with the first insurance carrier and the second node associated with a second insurance carrier;
store, in a data storage, file content of the file, wherein the data storage is outside of the blockchain system, wherein the data storage includes a hierarchy of folders and files that are organized based on insurance claims, the file being stored associated with a file path based on the insurance claims;
cause to generate a file hash of the insurance document, wherein generating the file hash comprises: generating a first hash component based on a file name of the insurance document, generating a second hash component based on the file path in the hierarchy of folders and files of the data storage, generating the file hash that includes the first hash component and the second hash component;
record the file hash of the insurance document in a distributed ledger of the blockchain system, wherein the file hash is used as an access identifier of the file content signifying that nodes possessing the file hash are authorized to access the file content stored in the data storage outside of the blockchain system;
receive a request for the insurance document from the second insurance carrier;
authenticate the second insurance carrier at the second node through an application programming interface outside of the blockchain system;
input one or more parameters related to the second insurance carrier to the smart contract to determine whether the second insurance carrier satisfies the one or more conditions of the insurance transaction, wherein the smart contract, executing the automatic program instructions, determines that the second insurance carrier satisfies the one or more conditions of the insurance transaction;
cause, responsive to the smart contract determining that the second node satisfies the one or more conditions of the insurance transaction, a transmission of the file hash from the first node associated with the first insurance carrier to the second node associated with the second insurance carrier;
cause the second node to determine, based on the file hash, the file path of insurance document in the data storage; and
responsive to the second node determining the file path, cause the data storage outside of the blockchain system to transmit the file content of the insurance document from the data storage to the second node associated with the second insurance carrier, wherein the file content is not transmitted directly between the first node and the second node.

18. The one or more non-transitory computer-readable media of claim 17, wherein the instructions, when executed, further cause the one or more processors to:
execute program code stored in a smart contract; and
transmit the file hash to the second node based on the program code authorizing the second node to receive the insurance document.

19. The one or more non-transitory computer-readable media of claim 17, wherein the file hash further includes:
a content hash generated by applying a hash function to the file content; and
a folder hash generated by applying the hash function or a different hash function to a file path that references a stored location of the file content within a file system of the data storage.

20. The one or more non-transitory computer-readable media of claim 17, wherein the instructions, when executed, further cause the one or more processors to encrypt the file content stored in the data storage.

* * * * *